United States Patent
Zhang et al.

(10) Patent No.: US 12,404,049 B2
(45) Date of Patent: Sep. 2, 2025

(54) SYSTEMS AND METHODS FOR A SOFT-BODIED AERIAL ROBOT FOR COLLISION RESILIENCE AND CONTACT-REACTIVE PERCHING

(71) Applicants: Wenlong Zhang, Chandler, AZ (US); Karishma Patnaik, Tempe, AZ (US); Pham Nguyen, Mesa, AZ (US); Shatadal Mishra, Tempe, AZ (US); Panagiotis Polygerinos, Gilbert, AZ (US)

(72) Inventors: Wenlong Zhang, Chandler, AZ (US); Karishma Patnaik, Tempe, AZ (US); Pham Nguyen, Mesa, AZ (US); Shatadal Mishra, Tempe, AZ (US); Panagiotis Polygerinos, Gilbert, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 59 days.

(21) Appl. No.: 18/144,726

(22) Filed: May 8, 2023

(65) Prior Publication Data
US 2023/0356862 A1 Nov. 9, 2023

Related U.S. Application Data

(60) Provisional application No. 63/339,312, filed on May 6, 2022.

(51) Int. Cl.
*B64U 60/00* (2023.01)
*B64U 20/30* (2023.01)
(Continued)

(52) U.S. Cl.
CPC ............. *B64U 60/00* (2023.01); *B64U 20/30* (2023.01); *B64U 20/60* (2023.01); *G05D 1/654* (2024.01)

(58) Field of Classification Search
CPC ........ B64U 60/00; B64U 20/60; B64U 20/30; G05D 1/654
See application file for complete search history.

(56) References Cited

U.S. PATENT DOCUMENTS

| | | |
|---|---|---|
| 9,448,562 B1 * | 9/2016 | Sirang .................. G05D 1/0676 |
| 9,753,461 B1 * | 9/2017 | Johnson ............... G05D 1/0011 |

(Continued)

FOREIGN PATENT DOCUMENTS

| | | | | |
|---|---|---|---|---|
| CN | 216301515 U | * | 4/2022 | |
| WO | WO-2015200209 A1 | * | 12/2015 | ........... B64C 39/024 |
| WO | WO-2017148923 A1 | * | 9/2017 | ............... B64C 1/34 |
| WO | WO-2017154552 A1 | * | 9/2017 | ........... B64C 11/001 |

OTHER PUBLICATIONS

Briod, A. et al., "A Collision Resilient Flying Robot," Journal of Field Robotics, vol. 31, No. 4, Jul. 2014, pp. 496-509.

(Continued)

*Primary Examiner* — Joshua D Huson
*Assistant Examiner* — Peter A Taraschi
(74) *Attorney, Agent, or Firm* — Polsinelli PC

(57) ABSTRACT

A fabric-based, soft-bodied aerial robot includes contact-reactive perching and embodied impact protection structures while remaining lightweight and streamlined. The aerial robot is operable to 1) pneumatically vary its body stiffness for collision resilience and 2) utilize a hybrid fabric-based, bistable (HFB) grasper to perform passive grasping. When compared to conventional rigid drone frames the soft-bodied aerial robot successfully demonstrates its ability to dissipate impact from head-on collisions and maintain flight stability without any structural damage. Furthermore, in dynamic (Continued)

perching scenarios the HFB grasper is capable to convert impact energy upon contact into firm grasp through rapid body shape conforming in less than 4 ms.

20 Claims, 27 Drawing Sheets

(51) Int. Cl.
*B64U 20/60* (2023.01)
*G05D 1/654* (2024.01)

(56) References Cited

U.S. PATENT DOCUMENTS

| 2016/0376031 | A1* | 12/2016 | Michalski | G05D 1/652 |
| | | | | 701/15 |
| 2017/0217562 | A1* | 8/2017 | Schalla | B64U 50/19 |
| 2020/0148360 | A1* | 5/2020 | Zhang | B64D 1/22 |

OTHER PUBLICATIONS

Zhang, H. et al., "Compliant Bistable Gripper for Aerial Perching and Grasping," International Conference on Robotics and Automation (ICRA), May 20-24, 2019, pp. 1248-1253.

Ruiz, F. et al., "Sophie: SOft and flexible aerial vehicle for PHysical Interaction with the Environment," IEEE Robotics and Automation Letters, 7(4), Jun. 2022, pp. 11086-11093.

* cited by examiner

Grasper Passive Activation 4μs

Grasper Pneumatic Recoil 3s

Approach

Contact

Impact Mitigation

Recoil and Recover

Fly Away Safely

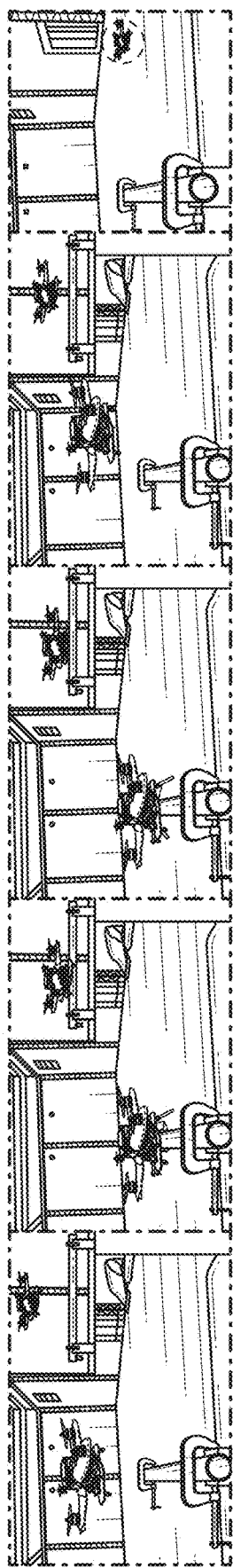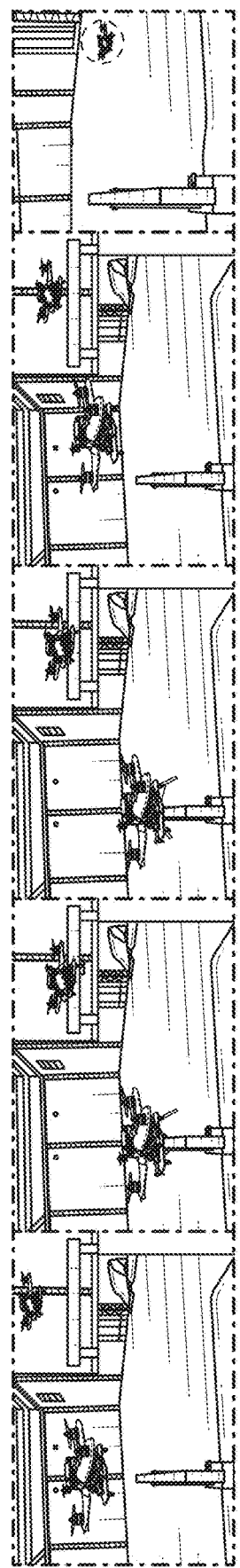

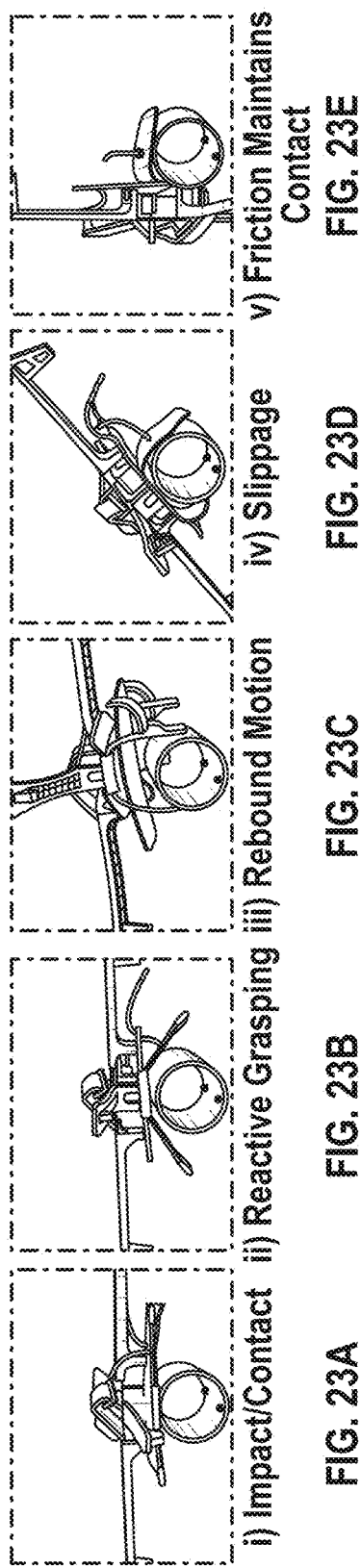
FIG. 23A i) Impact/Contact
FIG. 23B ii) Reactive Grasping
FIG. 23C iii) Rebound Motion
FIG. 23D iv) Slippage
FIG. 23E v) Friction Maintains Contact
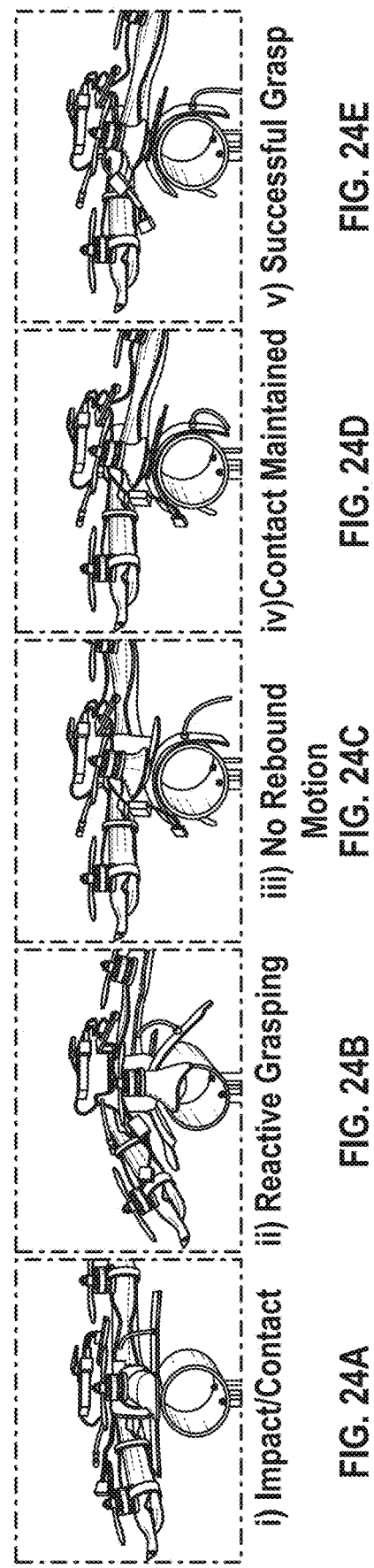
FIG. 24A i) Impact/Contact
FIG. 24B ii) Reactive Grasp
FIG. 24C iii) No Rebound Motion
FIG. 24D iv) Contact Maintained
FIG. 24E v) Successful Grasp

SYSTEMS AND METHODS FOR A SOFT-BODIED AERIAL ROBOT FOR COLLISION RESILIENCE AND CONTACT-REACTIVE PERCHING

CROSS-REFERENCE TO RELATED APPLICATIONS

This is a U.S. Non-Provisional Patent Application that claims benefit to U.S. Provisional Patent Application Ser. No. 63/339,312 filed 6 May 2022, which is herein incorporated by reference in its entirety.

FIELD

The present disclosure generally relates to aerial robotics, and in particular, to a system and associated method for a soft-bodied aerial robot that is operable for contact-reactive perching and collision resistance.

BACKGROUND

Perching highlights the ability for aerial robots to save energy and maintain a vantage position for monitoring or surveillance. Existing aerial robots coordinate perching mechanisms and flight dynamics to achieve perching. Various bio-inspired perching mechanisms have been developed for aerial robots, including electrostatic adhesion, dry adhesion, microspines and strings, activated preloaded spike vertical surfaces, and claw-like avian-inspired graspers. Nature, however, calls attention to various physically intelligent features that can enhance the proficiency of dynamic aerial robot perching and grasping. Birds and bats enter a coordinated post-stall maneuver, to maintain a constant rate of approach in combination with a high angle of attack. At impact, their feet clasp the irregular perch and their legs bend to absorb their momentum. Their feet also utilize a passive tendon locking mechanism, so no additional energy is wasted during perching. Even smaller insects, like flies, utilize a combination of collision and perching, and their compliant bodies help dampen the perching impact However, there is often a dissociation between controlled collision and dynamic perching in the existing design of aerial robots, as the rigid-body structures are not good at mitigating collision impact incurred during dynamic perching. Furthermore, avian-inspired graspers are limited to perching on cylindrical-shaped structures. Recent work has started taking into account controlled collision during dynamic perching. Roderick et. al highlights a robot that combines an adaptive avian-inspired grasper with embedded features (claws), and legs that absorb the robot's momentum resulted from perching impact. Kirchgeorg et. al explores the use of an external protective exoskeleton, along with a high-friction, passive, hook-and-hang perching mechanism. These robots, however, do not extensively quantify their ability to mitigate the high impact in collision-based perching. They also limit their grasping targets to branches with circular cross-sections.

Along with dynamic perching, aerial robots also have to deal with unexpected interactions in obstacle-laden environments with poor visual conditions. Therefore, collisions are inevitable even with state-of-the-art collision avoidance and computer vision systems. With aerial robots, high-energy impacts or collisions can lead to structural damage or loss of control, resulting in crashes.

It is with these observations in mind, among others, that various aspects of the present disclosure were conceived and developed.

BRIEF DESCRIPTION OF THE DRAWINGS

FIGS. 21A-21E show a sequence of images captured of the aerial robot of FIG. 1A during a takeoff, perch, recover and land sequence with a circular perching surface;

FIGS. 22A-22E show a sequence of images captured of the aerial robot of FIG. 1A during a takeoff, perch, recover and land sequence with a rectangular perching surface;

FIGS. 23A-23E show a sequence of images captured of a rigid frame during a perching sequence;

FIGS. 24A-24E show a sequence of images captured of the aerial robot of FIG. 1A during a perching sequence;

Corresponding reference characters indicate corresponding elements among the view of the drawings. The headings used in the figures do not limit the scope of the claims.

DETAILED DESCRIPTION

The present disclosure provides various systems and methods for a soft-bodied aerial robot (SoBAR), hereinafter "aerial robot", capable of effectively mitigating high-impact and head-on collisions with the environment, as well as absorbing impact forces during collision-based perching. The aerial robot includes a lightweight soft-bodied frame that can pneumatically modulate its stiffness for contact resilience and flight stability. The aerial robot uses high-strength woven fabric and is robust to environmental interactions but still easily stowable. In one embodiment, the process of setting up and reassembling the aerial robot takes approximately 4 minutes, making the aerial robot easily portable.

An aim of the present disclosure is to develop a collision-resilient aerial robots with compliant bodies to sustain collisions while remaining stable in the air and/or surviving structural damage after crashing. To approach the problem of collision resilience and safe perching, soft robotics has emerged as a promising solution. Compliant materials have been utilized to design soft or foldable wings, deformable rotors, compliant joints and armatures, and compliant graspers or landing gears. These soft solutions for perching and grasping, however, are often limited by their load bearing capabilities and slow grasping speeds. The former limits their ability to maintain a strong grasp on objects or carry meaningful payloads. Due to their limited grasping speeds, they resort to hovering closely or landing on the perch prior to grasping. They also sometimes require active actuation to maintain constant grasping or perching position, which reduces the overall system efficiency.

1. System Overview

Figure 1B:
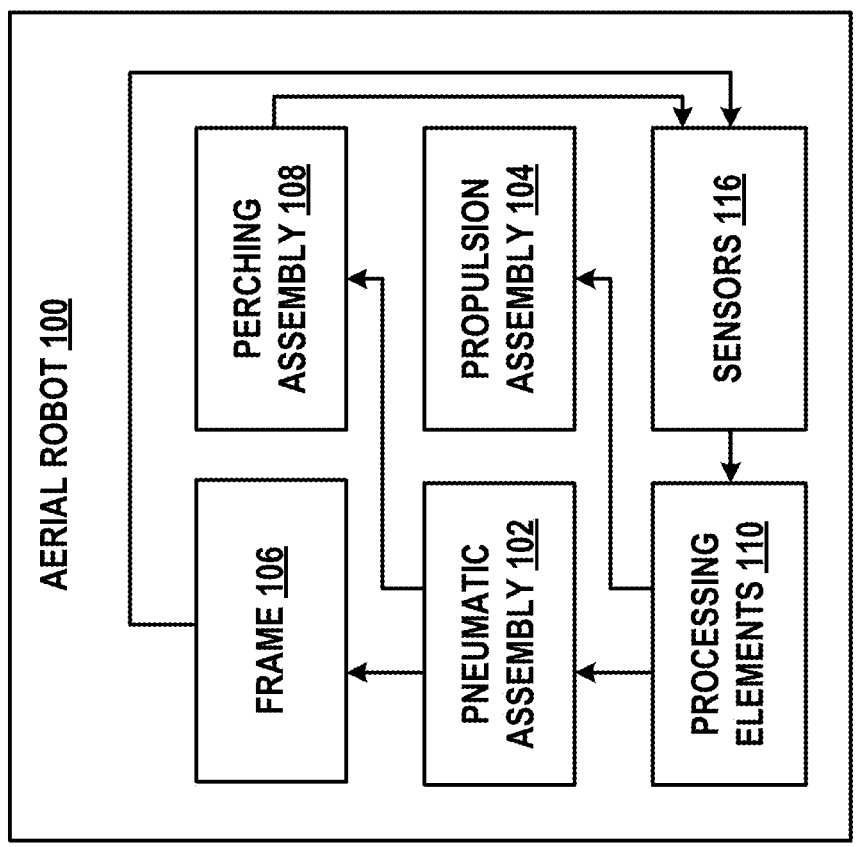
FIG. 1B is a simplified block diagram showing components of the aerial robot of FIG. 1A.
Figure 1A:
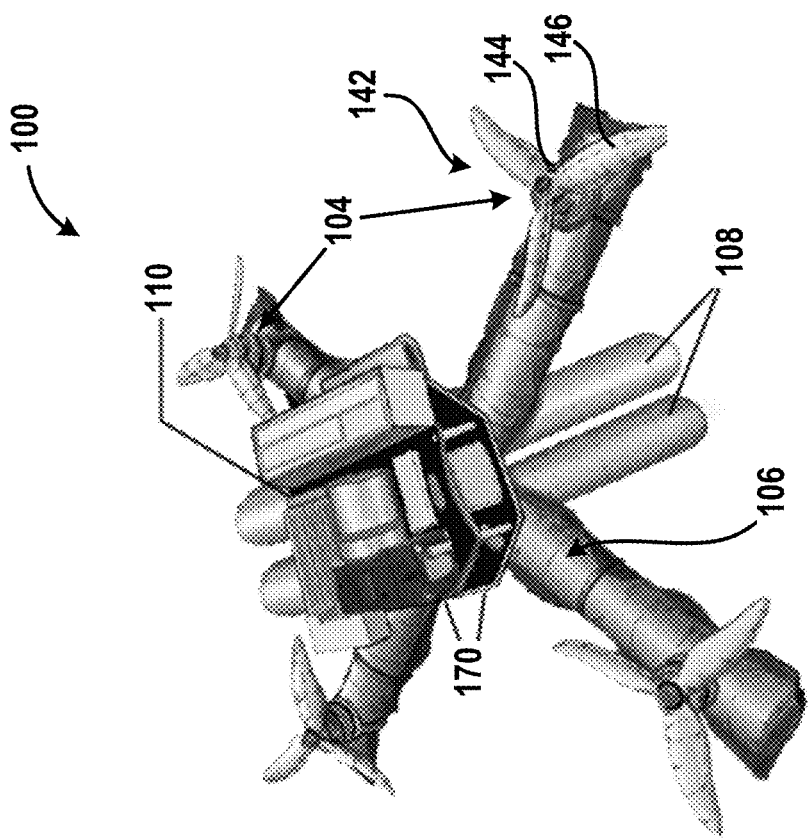
FIG. 1A is an illustration showing a soft-bodied aerial robot according to embodiments outlined herein.

In one aspect, an aerial robot 100 shown in FIGS. 1A and 1B includes a pneumatic assembly 102, a propulsion assembly 104, and a frame 106. Importantly, the frame 106 communicates with the pneumatic assembly 102 to provide a lightweight and shock-absorbent structure for collision resilience. The frame 106 can include a plurality of frame members 162 that extend from a body portion 164 of the frame 106. In some aspects, the frame 106 provides a structure for mounting components of the propulsion assembly 104, which can be positioned along each respective frame member 162 of the plurality of frame members 162. Upon collision with an object, the frame 106 can vary in "stiffness" to reduce shock and damages associated with a rapid change in acceleration over a collision time by extending a length of the collision time. Further, the frame 106 can deform as needed during collision to protect other components of the aerial robot 100, such as the propulsion assembly 104.

Figure 1D:
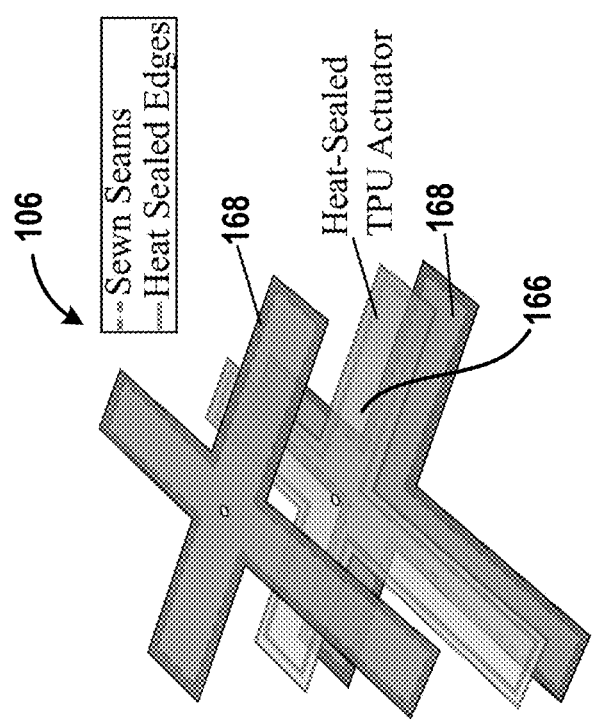
FIG. 1D is an illustration showing construction of the frame of the aerial robot of FIG. 1A.
Figure 1C:
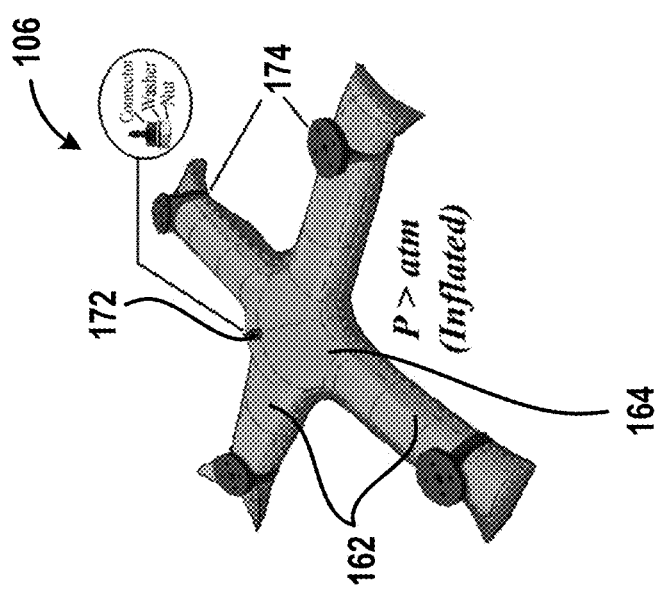
FIG. 1C is an illustration showing a frame of the aerial robot of FIG. 1A having been inflated.

With additional reference to FIGS. 1C and 1D, the frame 106 can include a frame balloon 166 in fluid flow communication with the pneumatic assembly 102, where the frame balloon 166 is encased within an outer layer 168 including a pliable material. The frame balloon 166 can capture air or another gas therein. When inflated, the frame balloon 166 provides a lightweight and shock-absorbent structure. When deflated, the frame balloon 166 allows compact storage of the frame 106.

The pneumatic assembly 102 is operable for modulating an internal pressure of the frame balloon 166 in response to one or more frame control signals. In some examples, the frame control signals applied to the pneumatic assembly 102 can be generated based on collision detection information to modulate the internal pressure of the frame balloon 166 for collision resilience.

The propulsion assembly 104 can be mounted along the frame 106, and can include one or more propulsion elements 142 that enable controlled flight of the aerial robot 100. In some examples, each respective propulsion element 142 can include a motor 144 connected to a propeller 146 that collectively enable controlled flight of the aerial robot 100. Each respective propulsion element 142 can receive one or more propulsion control signals that control a trajectory of the aerial robot 100.

Figure 2A:
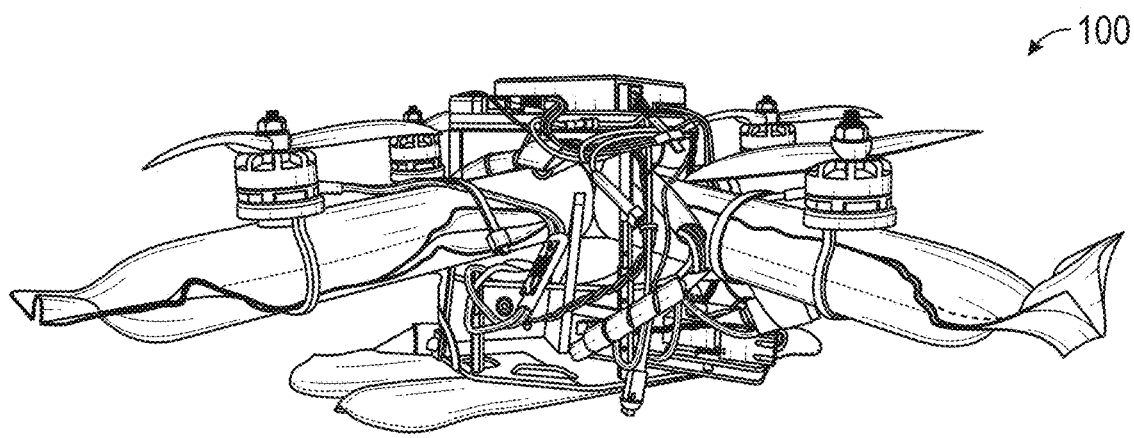
FIG. 2A is a photograph showing the aerial robot of FIG. 1A during flight.
Figure 2B:
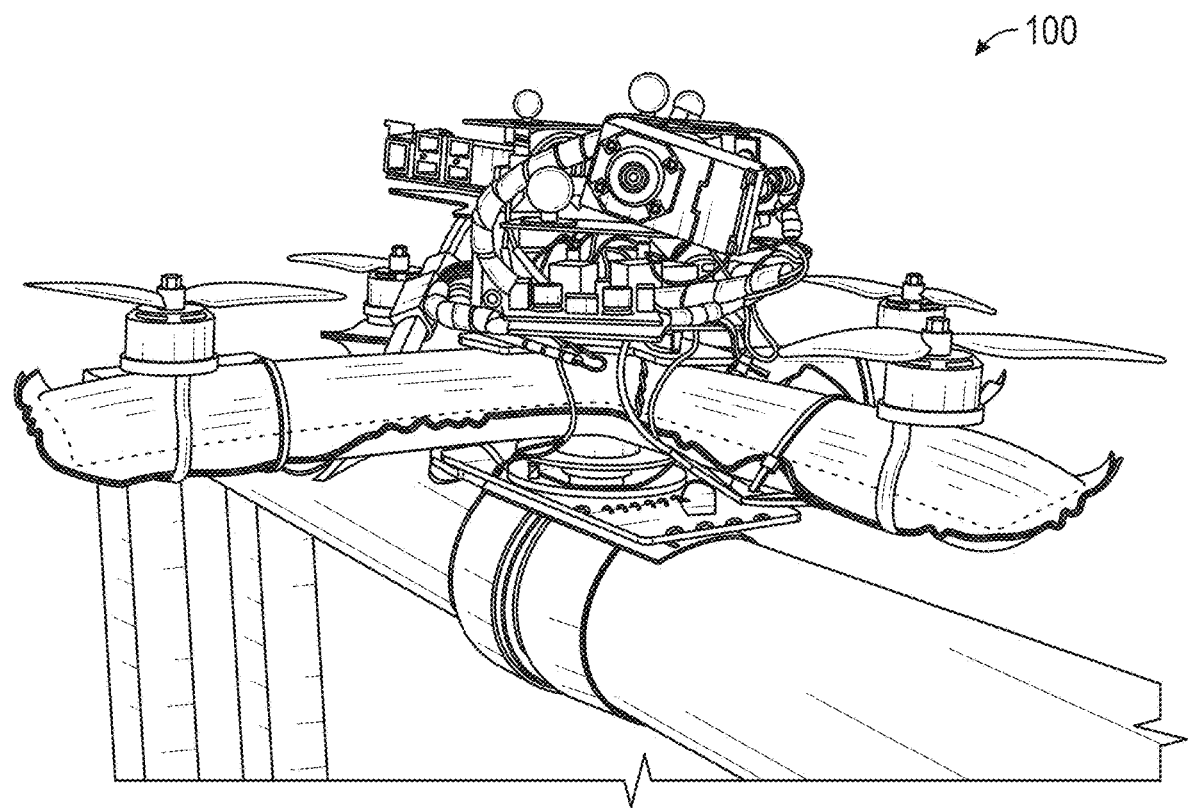
FIG. 2B is a photograph showing the aerial robot of FIG. 2A landed on a perching surface.

The aerial robot 100 can further include a perching assembly 108 coupled to the frame 106. The perching assembly 108 can include one or more hybrid fabric-based bi-stable (HFB) graspers 182 that are contact-reactive, e.g., such that the graspers 182 instantaneously transition from a first "open" state to a second "closed" state upon contact with a surface. Each respective grasper 182 can include a bistable spring element 184 that is including configurable between a first open state and a second curled state. To "grasp" a target surface, such as a perching surface or an object, the graspers 182 of the perching assembly 108 contact the target surface when in the first open state and automatically transition to the second closed state in which each grasper 182 "curls" around the target surface. FIGS. 2A and 2B show photographs of one embodiment of the aerial robot 100 during flight and following landing on a perching (target) surface.

Further, each respective grasper 182 can include a grasper balloon 186 in fluid flow communication with the pneumatic assembly 102 and positioned along the bistable spring element 184. To release the target surface, the grasper balloon 186 applies an external force along the bistable spring element 184 when in the second curled state. This causes the bistable spring element 184 to "straighten out" and transition from the second curled state to the first open state.

The pneumatic assembly 102 is operable for modulating an internal pressure of the grasper balloon 186 in response to one or more grasper control signals. In a primary embodiment, application of the grasper control signals enable selective release of objects or surfaces captured within the perching assembly 108 by causing each grasper balloon 186 to inflate, thereby causing the bistable spring element 184 to "straighten out" and transition from the second curled state to the first open state.

The aerial robot 100 can further include one or more processing elements 110 (e.g., a flight controller and/or a high-level computing device) for generating various control signals associated with operation of the aerial robot 100, including those associated with the pneumatic assembly 102 for actuating components of the frame 106 and/or the perching assembly 108, and those associated with the propulsion assembly 104 for trajectory planning and control. The processing elements 110 can communicate with a plurality of sensors 116, which can include one or more pressure sensors for measuring internal pressures associated with the frame 106 and/or the perching assembly 108, and can also include one or more sensors for measuring position, attitude/spatial orientation, acceleration, and velocity of the aerial robot 100.

The processing elements 110 can communicate with one or more memories (shown as memory 340 in FIG. 26) that includes instructions executable by the processing elements 110 to perform functionalities needed for the aerial robot 100 to function. For example, the memory can include instructions executable by the processing elements 110 to: generate, based on information captured by the sensors 116, one or more frame control signals for application to the pneumatic assembly 102 for modulating the internal pressure of the frame balloon 166. In some examples, the frame control signals can be generated based on collision detection information obtained using a position and attitude control model.

FIG. 2A shows one embodiment of the aerial robot 100 in flight. For trajectory planning and control, the memory can also include instructions executable by the processing elements 110 to: generate, based on information captured by the sensors 116, one or more propulsion control signals for application to the propulsion assembly 104 based on the position and attitude control model.

FIG. 2B shows one embodiment of the aerial robot 100 landing on a perching surface. For landing at a target object (e.g., an object to be picked up, or a perching surface), the memory can include instructions executable by the processing elements 110 to execute a landing or perching sequence. These instructions can be executable by the processing elements 110 to: generate, based on information captured by the sensors 116 and with respect to a target position of a target object, one or more propulsion control signals for application to the propulsion assembly 104 based on a position and attitude control model; generate propulsion control signals for application to the propulsion assembly 104 that, when applied at the propulsion assembly 104, align the perching assembly 108 of the aerial robot 100 with the target object; and deactivate, following capture of the target object at the grasper 182 of the aerial robot 100, one or more propulsion elements 142 of the propulsion assembly 104.

Further, for release of an object or surface from the perching assembly 108, the memory can also include instructions executable by the processing elements 110 to: generate one or more grasper control signals for application to the pneumatic assembly 102 that, when received at the pneumatic assembly 102, cause the pneumatic assembly 102 to inflate the grasper balloon 186.

The frame 106 provides a strong but lightweight structure for the aerial robot 100—importantly, the frame 106 is designed with mechanical resilience to collisions in mind. The aerial robot 100 also includes the processing elements 110 for trajectory planning, flight control and collision mitigation. Further, the aerial robot 100 includes the perching assembly 108, which can include one or more graspers (e.g., graspers 182) that react to impact upon contact with the perching surface. Utilizing an inherent snap-through buckling instability, the graspers 182 absorb impact energy associated with landing along a perching surface and uses the impact to transform into a continuum closed-form grasping shape in about 4 ms. Further, the graspers 182 do not require control inputs or active actuation by other components of the aerial robot 100 in order to automatically grasp a perching structure, do not require any additional energy to maintain grasping, and can be pneumatically retracted to their original configuration in less than 3 seconds. Finally, the present disclosure provides successful demonstration of the ability of the aerial robot 100 to autonomously perch and recover on various sized and shaped objects.

Referring to FIG. 1A, the aerial robot 100 includes a chassis 170 that provides a mounting structure for the frame 106, the pneumatic assembly 102, the perching assembly 108, and the processing elements 110. In some examples, the chassis 170 can also be configured to carry other components such as onboard sensors (including one or more of the plurality of sensors 116), and the like. In one example implementation, the frame 106 can be positioned below the chassis 170, and the perching assembly 108 can be positioned below the frame 106 as shown. Further, the processing elements 110 can be positioned along a top surface or interface of the chassis 170 as shown, although in some implementations, aspects of the processing elements 110, the plurality of sensors 116, and other computer-implemented devices and/or sensors can be positioned at any suitable location along the chassis 170.

The frame 106 can provide a mounting structure for the propulsion assembly 104 that communicates with the processing elements 110 and enables controlled flight of the aerial robot 100.

2. Materials and Methods 2.1 Design of Soft-Bodied Frame

Figure 3C:
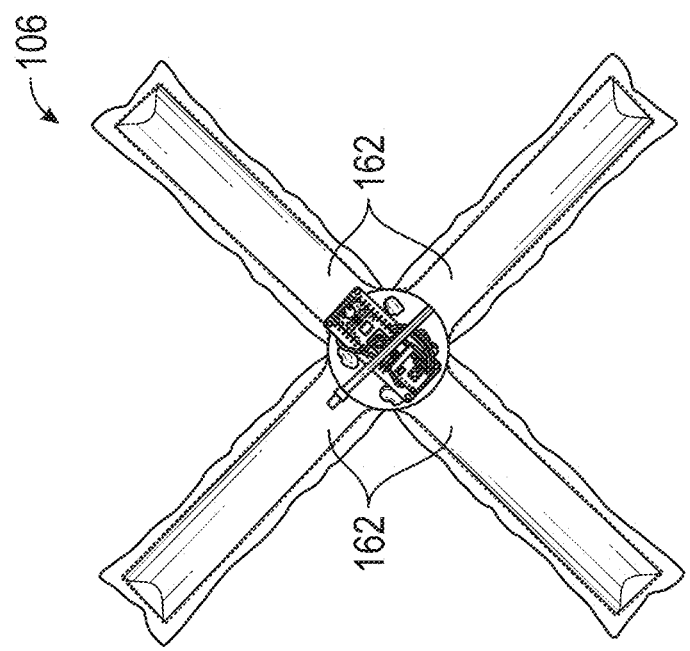
FIGS. 3A-3C are a series of photographs respectively showing the frame of the aerial robot of FIG. 2A in a stowed configuration, an un-inflated configuration, and an inflated configuration.
Figure 3B:
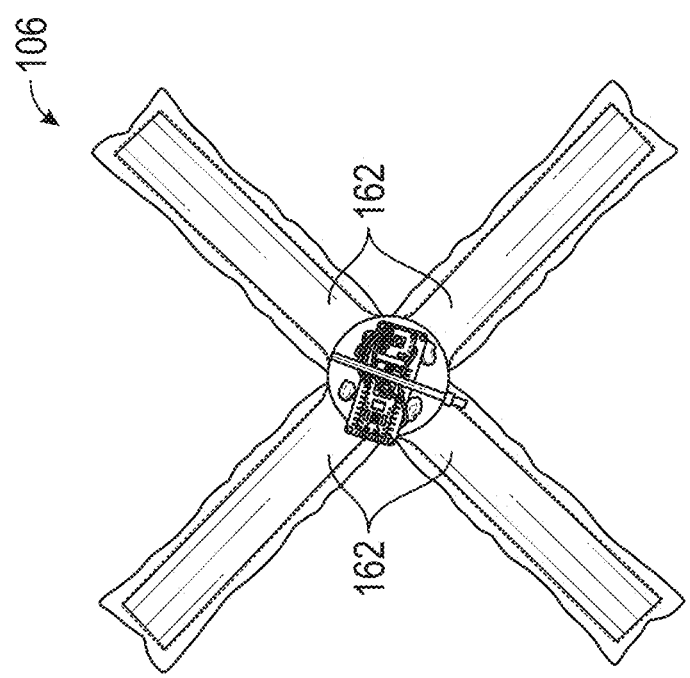
Figure 3A:
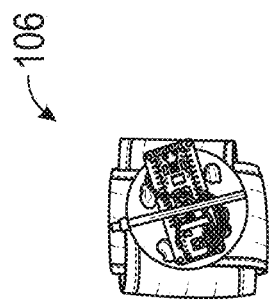

FIGS. 3A-3C show one embodiment of the frame 106 of the aerial robot 100. Importantly, the frame 106 can be pneumatic or otherwise inflatable, providing a lightweight and shock-absorbent structure that condenses into a compact form, as shown. The frame 106 can be of a standard "×" or "+" configuration, which enables benchmarking the mechanical resilience of the aerial robot 100 in one-arm or two-arm collisions. In some examples, the frame 106 can include the plurality of frame members 162 arranged along a common plane relative to one another that extend from the body portion 164 of the frame 106 as shown. The plurality of frame members 162 and the body portion 164 of the frame 106 can collectively form a unibody structure. The frame 106 can include the frame balloon 166 that captures and stores air or another suitable gas when inflated.

The frame 106 can include one or more mounting interfaces 174 along each respective frame member 162, where each mounting interface 174 couples with a respective propulsion element 142 of the plurality of propulsion elements 142 to secure the propulsion assembly 104 to the frame 106. In some examples, the frame 106 can further include a pneumatic connector 172 that establishes fluid flow communication an output of the pneumatic assembly 102 to the frame 106. The pneumatic connector 172 can also assume a "closed" position that prevents unintentional release of gas from the frame balloon 166, and enables selective modulation of the internal pressure of the frame balloon 166 as needed. The pneumatic connector 172 can be positioned along a top surface of the body portion 164 of the frame 106 for convenience, however in other examples the pneumatic connector 172 may be positioned elsewhere along the frame 106.

In some examples, a "stiffness" of the frame 106 can be selectively modified as needed through pneumatic activation, e.g., by adjusting a pressure of gas captured within the frame balloon 166. In some examples, frame control signals for modifying a "stiffness" of the frame 106 can be generated by the processing element(s) 110 based on a stiffness control model. Frame control signals can be generated upon detection of an impending or occurring collision, and can enable the aerial robot 100 to "prepare" for the collision by defensively modifying the stiffness of the frame 106 in order to: protect internal components, place the aerial robot 100 in a position to perch or land, and/or enable the aerial robot 100 to "bounce off" and fly again. This aspect can provide the frame 106 with mechanical resilience to external interactions, allowing absorption of impact-induced energies. FIG. 3A shows that at zero internal pressure, the frame 106 is completely collapsible and each arm can compress from 20.5 cm to 3 cm; a reduction in length of 85%. For flight, the frame 106 can be inflated to a maximum stiffness to reduce undesired oscillations, instabilities, or slow flight maneuver responses. The frame 106 can absorb impact through deformation, which extends the impact time with the perching objects to support a collision-based passive perching maneuver with the grasper 182 discussed herein.

These characteristics enable the aerial robot 100 to handle high-speed collisions, collision-based perching, and emergency landings. Additionally the frame 106 being collision-safe eliminates the need for a traditional cage-like structure in applications where no humans are present, thus making the design compact and efficient.

In one example implementation, the frame 106 of the aerial robot 100 is constructed to be geometrically similar to DJI F450's standard rigid frame (319 mm×319 mm), for a fair comparison in collision tests. This implementation of the frame 106 of the aerial robot 100 weighs 10 grams, whereas DJI's frame weighs 120 grams. However, other examples are contemplated which can include alternative dimensions, quantity and/or orientation of frame members, weights, and propulsion element configurations.

2.2 Frame Fabrication

Figure 10:
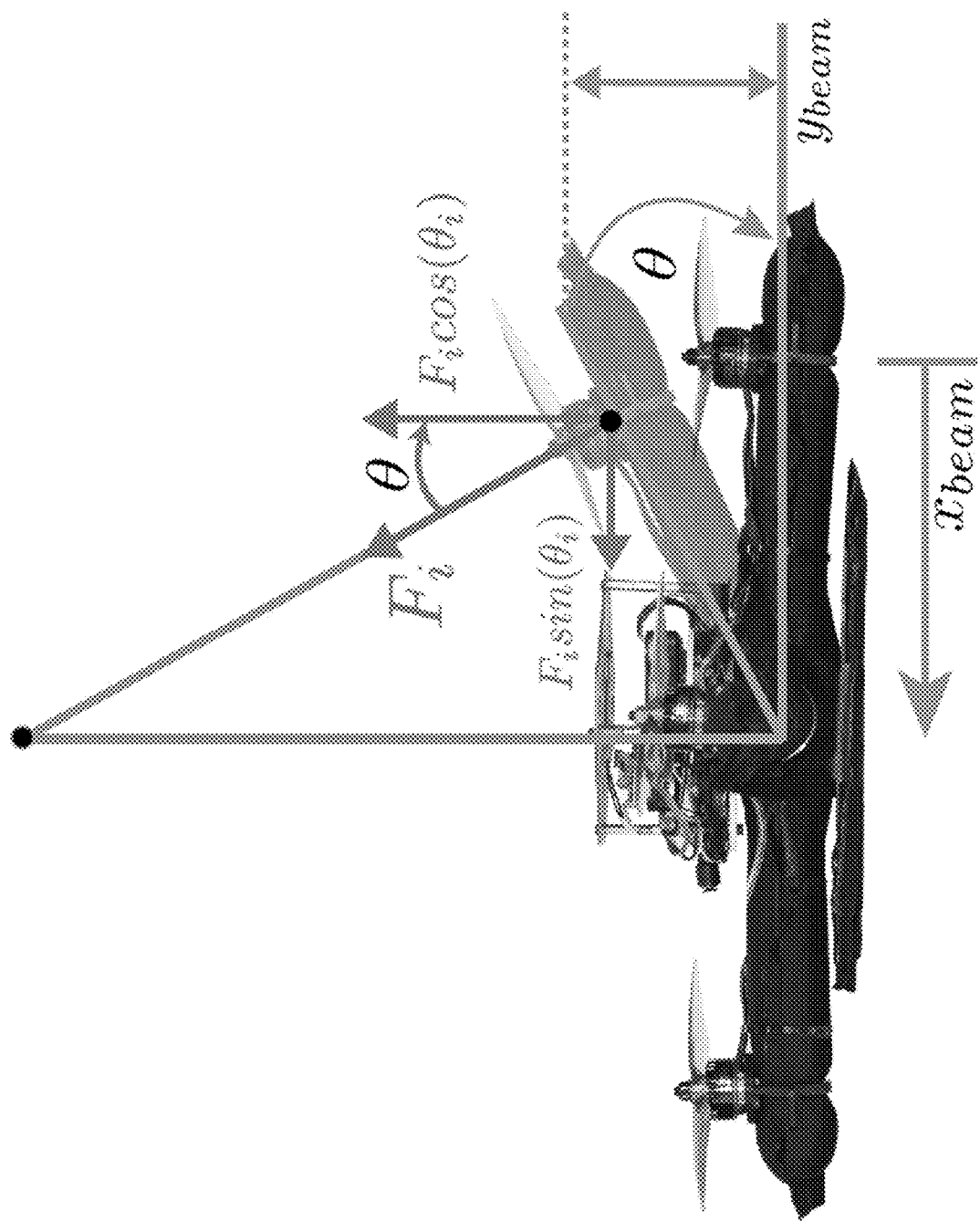
FIG. 10 is a simplified free-body diagram for analysis of a deflection angle of the aerial robot of FIG. 1A.
Figure 11:
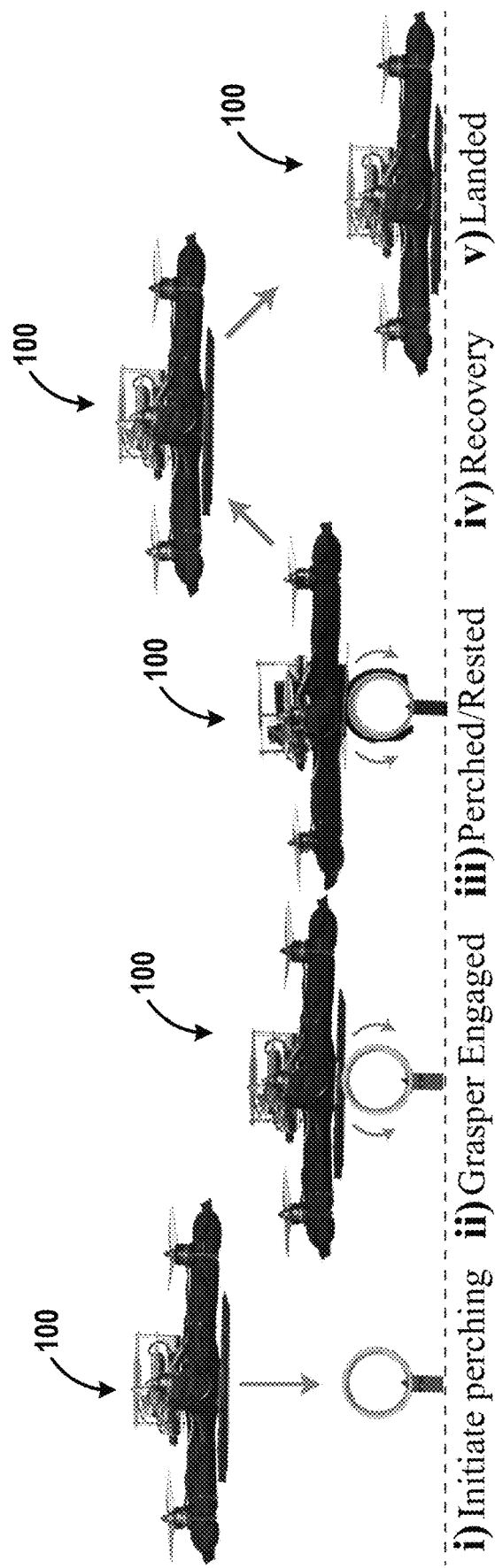
FIGS. 11A-11E are a series of photographs showing a perching sequence of the aerial robot of FIG. 1A.

A general sequence for fabrication of one embodiment of the frame 106 is discussed herein.
 (i) First, two portions of woven fabric (e.g., as the outer layer 168) and a heat-sealed TPU actuator (e.g., as the frame balloon 166) are cut to form the plurality of frame members 162 and the body portion 164, and are aligned in the arrangement shown in FIG. 1D. The two portions of woven fabric are sewn along the edges to capture the frame balloon 166 between the two portions of woven fabric using a super-imposed seam. Sensors may be positioned within the frame balloon 166 for measuring an internal pressure of the frame balloon 166.
 (ii) Next, the pneumatic connector 192 is connected to the frame balloon 166. The frame balloon 166 is then at least partially inflated. The mounting interfaces 174 for the propulsion assembly 104 are positioned along the frame members 162 as shown in FIG. 1D.
 (iii) The propulsion elements 142 including propellers and their associated motors, the chassis 170, the processing elements 110, and the perching assembly 108 are connected along the frame 106 as shown in FIG. 10.

Implementation example: A unibody structure was employed to fabricate the frame 106. In one implementation, nylon fabric, parchment paper, and TPU material (DT-2001, American Polyfilm, Branford, CT) were first cut into a desired morphology using a laser-cutter (Glowforge Prof, Glowforge, Seattle, WA). The frame balloon 166 was made by aligning two TPU sheet cut-outs, "sandwiching" the parchment paper in the middle, and heat-sealed utilizing the (FLHP 3802, FancierStudio, Hayward, CA), at 275° F. for 45 s. The pneumatic connector (fitting) (5463K361, McMaster-Carr, Elmhurst, IL) was also added in the frame balloon 166. The two sheets of nylon fabrics (e.g., as the outer layer 168) were sewn along the edges using a super-imposed seam, and the complete frame balloon 166 was inserted in the middle of the outer layer 168 to complete the frame 106.

2.3 Design of the HFB Grasper

The perching assembly 108 is shown in FIGS. 4A-7D and enables the aerial robot 100 to passively "perch" along a surface as shown in FIG. 2B. The perching assembly 108 includes the graspers 182 that "curl" upon impact. In some examples, each grasper 182 includes a TPU-coated nylon fabric external structure (e.g., the grasper balloon 186 enveloped in an outer layer 188) that encases bistable spring elements 184, where each bistable spring element 184 is capable of converting high-impact energy and instantly reacting to the contact to go from a straight beam (e.g., the open state shown in FIG. 4B) to the rapidly curling "closed" state shown in FIG. 4C.

The design combines the energy storage nature of deformable spring steels and fabric-based actuators. Each bistable spring element 184 includes a concave face and a convex face, and is bistable spring element 184 configurable between the open state and the closed state. Application of an external collision force along the concave face of the bistable spring element 184 when in the open state causes the bistable spring element 184 to transition to the closed state. Each bistable spring element 184 when activated, leads to power amplification and rapid curling movements that are highly desired for grasping. Furthermore, after perching, no further mechanical activation is required.

Figure 4B:
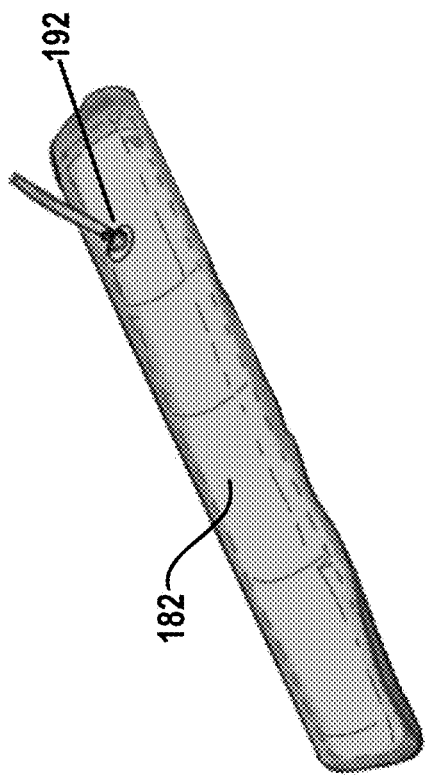
FIGS. 4B and 4C respectively show assembled views of the grasper of FIG. 4A in a first open state and a second closed state.
Figure 4C:
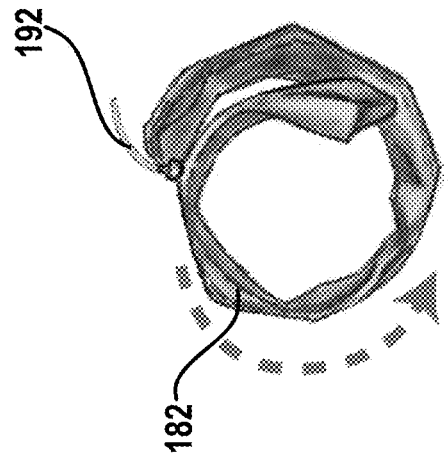
Figure 4A:
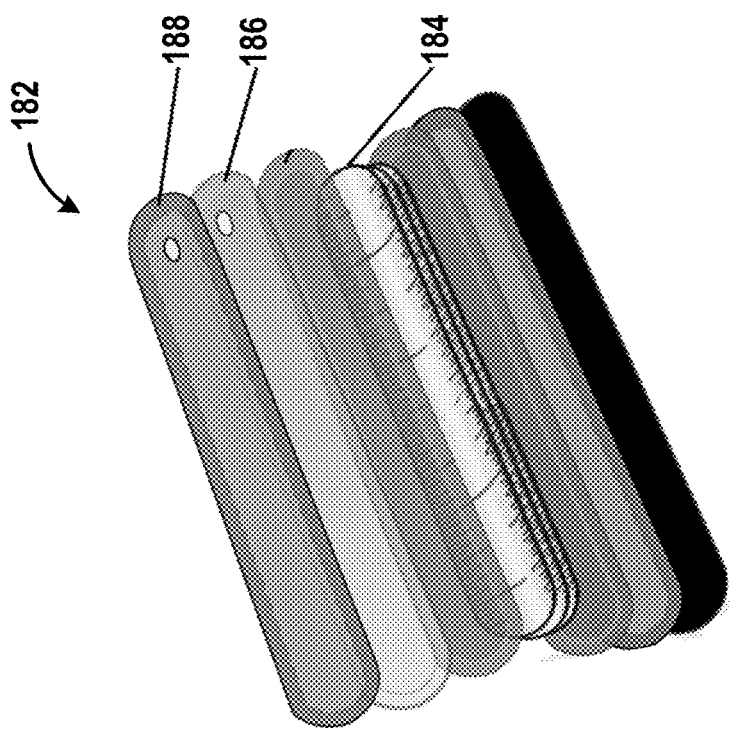
FIG. 4A is an illustration showing construction of a grasper of a perching assembly of the aerial robot of FIG. 1A.

Referring to FIG. 4A, each respective grasper 182 includes the grasper balloon(s) 186 that enable the perching assembly 108 to transition from the "closed" state back into the "open" state and enable the aerial robot 100 to release the perching surface or object. The grasper balloon(s) 186 can be positioned adjacent to the concave face or the convex face of the bistable spring element 184, such that inflating the grasper balloon(s) 186 applies an external force along the bistable spring element 184 when in the closed state. This action causes the bistable spring element 184 to "straighten out" and transition from the closed state to the open state. The grasper balloon(s) 186 can be in fluid flow communication with the pneumatic assembly 102 for selective inflation and deflation of the associated grasper 182, and can include a pneumatic connector 192 as shown in FIG. 4B. In contrast with the pneumatic operation of the frame 106 discussed above, each respective grasper 182 can be in an inflated or deflated state during flight and can deflate upon contact with a perching surface to allow the bistable spring elements 184 of the graspers 182 to transform into the "closed" state.

The grasper balloon(s) 186 enable the perching assembly 108 to quickly un-coil to the "open" state in which each respective grasper 182 resembles a straight beam as shown in FIG. 4B. In the "open" state, the graspers 182 can also be utilized as landing skids. Along with the soft-bodied configuration of the frame 106, the perching assembly 108 enables safe emergency landing of the aerial robot 100.

In some embodiments, the pneumatic assembly 102 can receive one or more grasper control signals from the processing element(s) 110 for selective modulation of an internal pressure of the grasper balloon(s) 186. Further, the sensors 116 can be positioned within the grasper balloon(s) 186 in communication with the processing element(s) 110 and/or the pneumatic assembly 102 for controlling the internal pressure of the grasper balloon(s) 186. In some examples, the pneumatic assembly 102 can fully inflate the grasper balloon(s) 186 for transitioning the graspers 182 to the "open" state and for maintaining the "open" state. To maintain the open state, the grasper balloon(s) 186 can be maintained at higher pressure to keep from triggering the bistable spring elements 184. When preparing for landing, the pneumatic assembly 102 can modulate the internal pressure of the grasper balloon(s) 186 to prepare for transitioning the graspers 182 to the "closed" state. This may involve, for example, decreasing the internal pressure of the grasper balloon(s) 186 such that an impact could trigger the bistable spring elements 184 into transitioning to the closed state. In some examples, modulating the internal pressure of the grasper balloon(s) 186 when the graspers 182 are "holding" an object or surface can allow the graspers 182 to conform to the object or surface and maintain their grip. To release the object or surface, the pneumatic assembly 102 can increase the internal pressure of the grasper balloon(s) 186 to transition the graspers 182 to the "open" state.

Figure 5A:
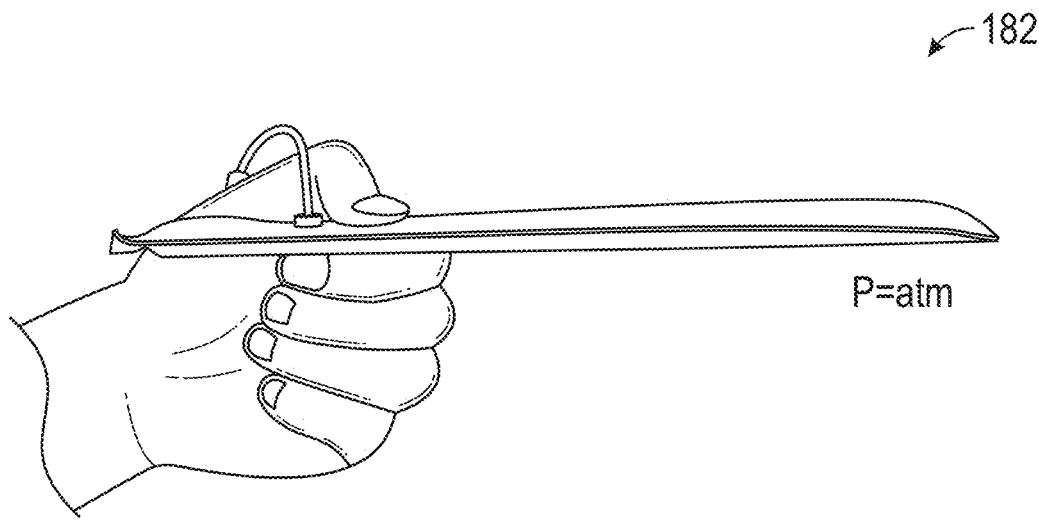
FIGS. 5A-5C are a series of photographs respectively showing the grasper of FIG. 4A in the first open state, the second closed state, and transitioning back into the first open state.
Figure 5B:
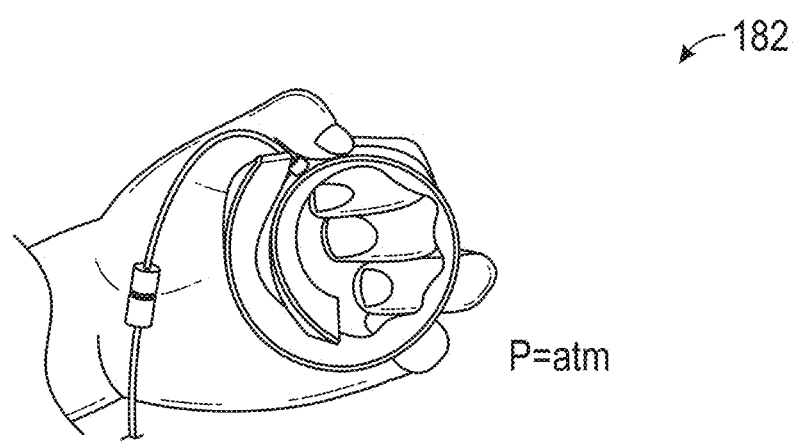
Figure 5C:
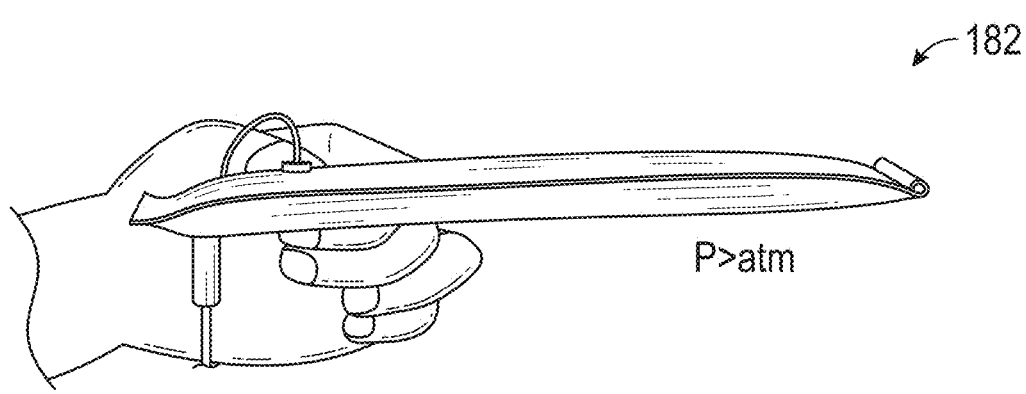

FIGS. 5A-5C show a sequence of the grasper 182 transitioning from the open state (FIG. 5A), the curled state (FIG. 5B), and transitioning back to the "open" state (FIG. 5C). FIGS. 6A-6D show various configurations for arrangement of the graspers 182 of the perching assembly 108 of the aerial robot 100, including 2-finger, 3-finger, 4-finger and 5-finger grasper configurations.

Fabricating the Grasper 182:
(i) First, the bistable spring elements 184 are formed by cutting and aligning pieces of spring steel metal.
(ii) Next, curl the bistable spring elements 184, along their convex sides, and maintain the position for 30 minutes.
(iv) Finally, align the woven fabric (e.g., as an outer layer), heat-sealed TPU actuator (as the grasper balloon 186), TPU-coated nylon, bistable spring elements 184, and grip material to create the grasper 182.

Implementation example: In order to fabricate the grasper 182, a lightweight bistable material was needed that would maintain a straight beam state but also is capable of switching to a curled state upon contact with the perch. To utilize a low-cost off-the-shelf solution, a bistable metallic tape-spring from a measuring tape (STANLEY STA030696N, Amazon.com Inc., Seattle, WA) was selected to construct the bistable spring elements 184. This would enable scaling the length of the actuator as well as thickness (by stacking multiple segments of tape-spring). The measuring tape segments were first cut to the desired size and the edges were chamfered for safety. The bistable spring elements 184 each have two sides, with one being concave and the other convex. To pre-form the spring steel, the bistable spring elements 184 were rolled and bent tightly along the convex side around a cylindrical object. The tightly curled spring steel was wrapped to maintain shape, for 30 min. The spring steel was then able to switch between two states: (i) straight beam (ii) curled state, shown in FIGS. 7A and 7B.

The TPU material (for the grasper balloon(s) 186), parchment paper, nylon fabric, and 210D TPU-coated nylon fabric (DIY Packraft Ltd., Smithers, BC), were cut utilizing a laser cutter. Grasper balloons 186 was manufactured in order to perform re-opening of the graspers 182 after perching. In one example, three pre-formed tape spring steels were aligned to form the bistable spring element 184 and sandwiched between the TPU-coated nylon sheets, and heat-sealed with the heat press, to make the spring steel set. A pouch (e.g., an outer layer) was then made utilizing nylon fabric, and the grasper balloon(s) 186 and bistable spring element 184 were inserted in the pouch. Finally, the bottom surfaces of each graspers 182 were equipped with high-friction grip material (3M TB614, 3M Company, Maplewood, MN), completing the fabrication of the graspers 182. Each completed grasper 182 weighs only 38 g. The multi-fingered perching mechanism can be designed in different orientations. In this work, the two-fingered and three-fingered grasper configurations for the aerial robot 100 were tested. Table 1 below shows a mass budget for the aerial robot 100.

TABLE 1

Mass Budget of SoBAR

| Unit | Weight (g) | Total Weight Percentage (%) |
| --- | --- | --- |
| Soft-bodied frame | 10 | 0.9 |
| 4 × (motor and propeller pair) | 126 | 11 |
| Micro diaphragm pump | 100 | 8.8 |
| 4S LiPo battery | 250 | 22 |
| Chassis | 81 | 7.1 |
| 4 × (motor mounts) | 28 | 2.4 |
| Flight controller | 50 | 4.4 |
| Intel UP board | 100 | 8.8 |
| 2 × (grasper fingers) | 76 | 6.7 |
| Grasper mount | 39 | 3.4 |
| Other electronics (power supply, upboard mounts, BEC modules, voltage regulator, wifi module and other miscellaneous) | 277 | 24.5 |

2.4 Hardware Overview

Figure 8:
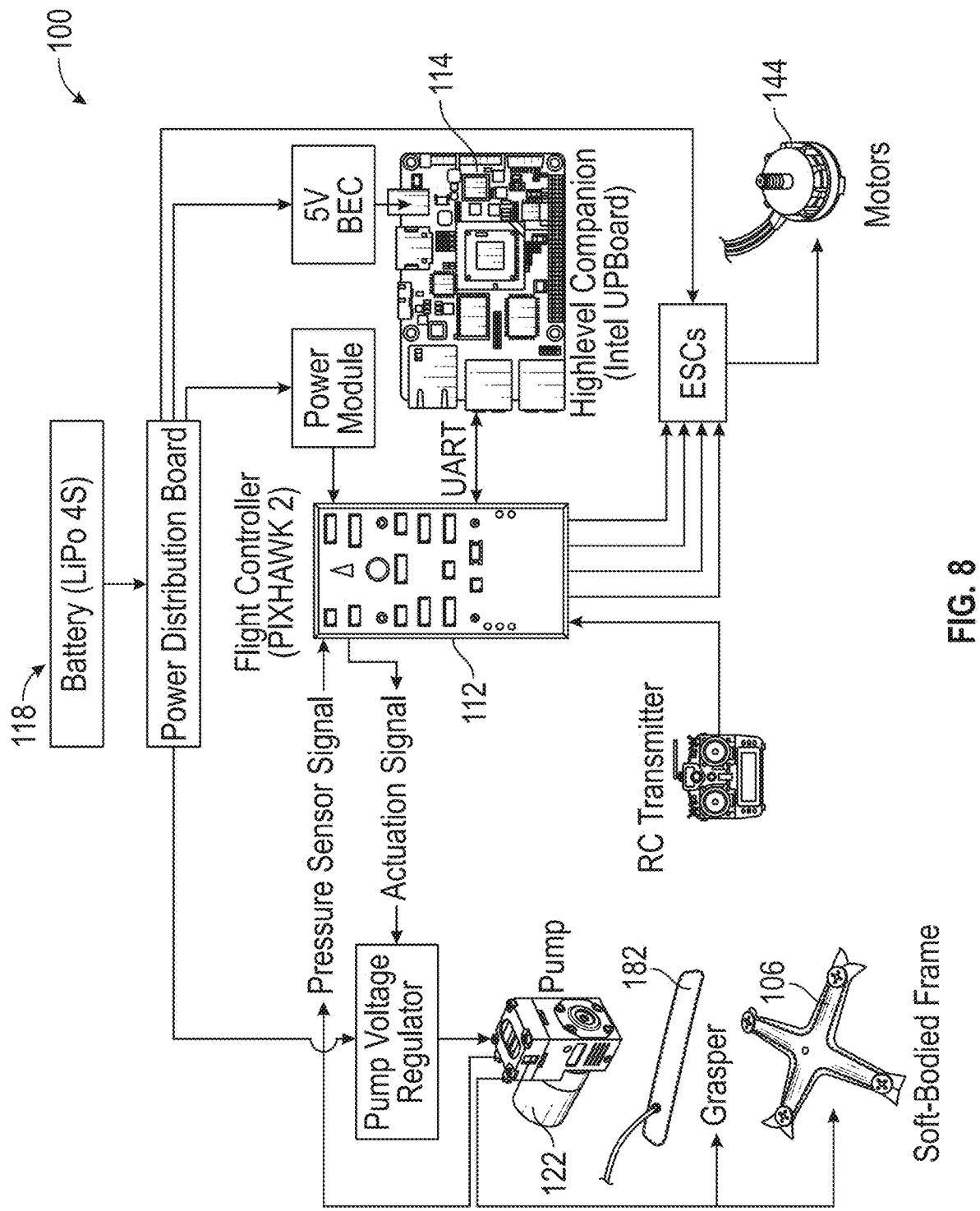
FIG. 8 is a diagram showing connections between various electronic components of the aerial robot of FIG. 1A for one particular embodiment.
Figure 9:
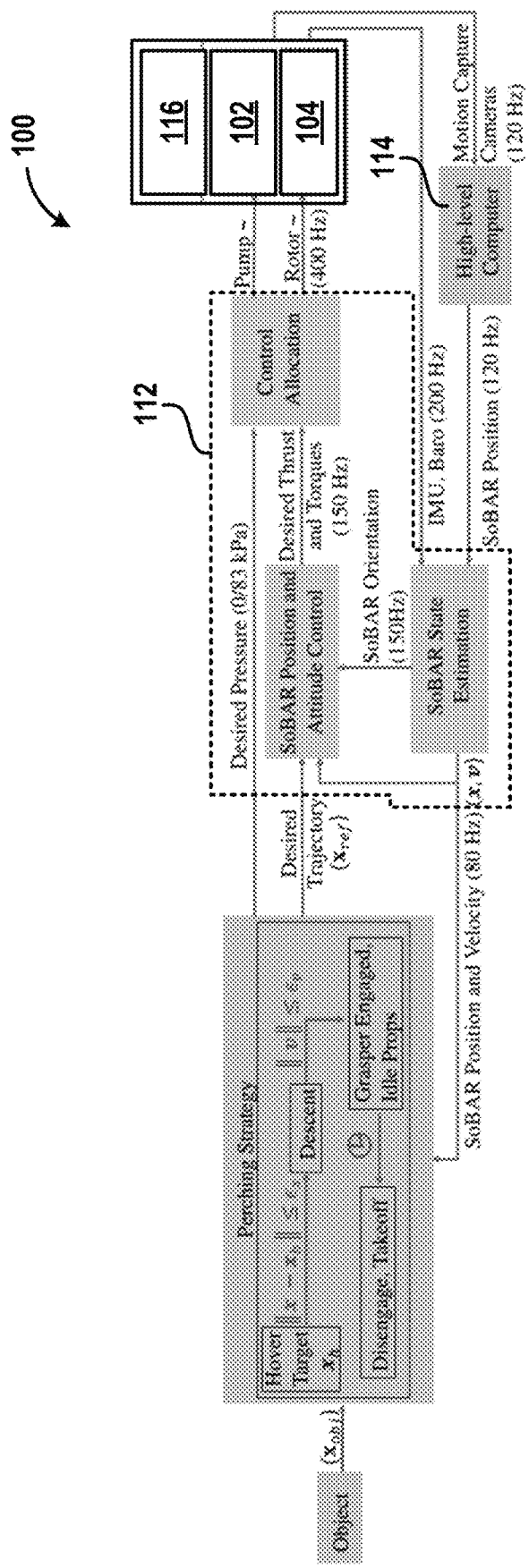
FIG. 9 is a diagram showing connections and data flow between various electronic components of the aerial robot of FIG. 1A.

The chassis 170 of the aerial robot 100 hosts various electronic components of the aerial robot 100, including the pneumatic assembly 102 involved in pneumatic functionalities of the frame 106 and/or the perching assembly 108 and the propulsion assembly 104 involved in trajectory planning, flight control and collision mitigation. FIGS. 8 and 9 show an overview of the electronic components of the aerial robot 100 including the processing elements 110 and a power assembly 118. In some embodiments, the processing elements 110 can include components of a flight controller 112 for generating control signals for the pneumatic assembly 102 and the propulsion assembly 104 based on sensor input. In some examples, the processing elements 110 can include components of a high-level computing device 114 for determining a position of the aerial robot 100 using images captured by a camera device of the plurality of sensors 116. The camera device could also be positioned external to the aerial robot (e.g., for tracking objects of interest within a "flight arena".

2.4.1 Flight Controller

As shown in FIG. 9, the flight controller 112 can receive and interpret signals from the plurality of sensors 116, including IMU signal data and barometer signal data (e.g., for measuring internal pressures). Signal data received at the flight controller 112 can be used to estimate states and orientations of the aerial robot 100. Based on these estimations, the flight controller 112 generates control signals for application to the pneumatic assembly 102 and the propulsion assembly 104.

In one example, the flight controller 112 communicates with one or more pressure sensors of the plurality of sensors 116 that are operable for measuring and communicating respective air pressures associated with the frame 106 and the perching assembly 108. In some embodiments, the pressure sensors can be positioned along different components of the frame 106 and the perching assembly 108—for example, pressure sensors can be distributed within individual frame members 162 and the body portion 164 of the frame, and within individual graspers 182 of the perching assembly 108. In some embodiments, the flight controller 112 can apply respective frame control signals and/or grasper control signals to an air pump 122 of the pneumatic assembly 102 for modulating internal pressures of the frame balloon 166 and/or the grasper balloon(s) 186. These control signals can be generated at the flight controller 112 based on information received from the pressure sensors and/or based on other control inputs from a user (e.g., by remote or wired control, etc.).

In one example, the flight controller 112 communicates with one or more spatial orientation sensors and/or one or more positional sensors of the plurality of sensors 116 that are operable for measuring flight characteristics of the aerial robot 100. In some embodiments, these sensors can be positioned as needed along the frame 106 or the chassis 170 of the aerial robot. In some embodiments, the flight controller 112 can apply propulsion control signals to the propulsion assembly 104 for controlling a flight trajectory of the aerial robot. The propulsion control signals can be generated based on information received from the plurality of sensors 116 and/or based on other control inputs from a user (e.g., by remote or wired control, etc.).

2.4.2 High-Level Computing Device

In some examples, the processing element(s) 110 include components of the high-level computing device 114 that handles computationally intensive tasks, such as those involved in image processing for position determination. In the example of FIG. 9, the high-level computing device 114 receives motion capture (image) signals from an image sensor of the plurality of sensors 116 (e.g., a camera) and determines a position of the aerial robot 100 based on these image signals. The position can be communicated to the flight controller 112 to estimate various flight characteristics of the aerial robot 100, including velocity and orientation. The high-level computing device 114 may also be employed to perform other, or additional, tasks. For example, computations performed by the flight controller 112 can be off-loaded to the high-level computing device 114 to save processing power and time consumed by the flight controller 112.

In FIG. 9, state estimation and control signal computations are performed at the flight controller 112. The high-level computing device 114 is used to interpret and relay the position information of the aerial robot 100 to the flight controller 112. The perching strategy, outlined along the left-hand side, represents a "state machine" of the aerial robot 100 during an autonomous perching task. Mathematical conditions represent event-triggered transitions while the clock symbol represents the time-triggered ones. Here, $x_h$ refers to the hover target location for the aerial robot 100, which is directly above the perching target before initiating the descent. The flight controller 112 receives information from sensors and generates control signals for application to the propulsion assembly 104 to place the aerial robot 100 at the hover target location $x_h$. After the errors in position are within a tolerance region denoted by $\epsilon_x$, the aerial robot 100 initiates the descent trajectory onto the perching target. Once the grasper 182 engages the perching target, the velocities are almost zero, indicating that the aerial robot 100 has perched. To take off again, the aerial robot 100 first disengages the grasper 182 (e.g., using the pneumatic assembly 102) and then takes off by engaging the propulsion assembly 104.

In one example, prior to flight, motor-propeller pairs (e.g., propulsion elements 142) of the propulsion assembly 104 are aligned along the mounting interfaces 174 of the frame 106 (e.g., along the frame members 162). The sensors 116 that communicate with the flight controller 112, the pneumatic assembly 102, and/or the propulsion assembly 104 are calibrated through QGroundControl. For validation of the aerial robot 100, experimental setups included a universal tensile testing machine, a high-speed camera, a high-G accelerometer, and a motion capture system are detailed herein.

Implementation example: One specific implementation example is outlined herein with respect to FIGS. 8 and 9. The chassis (e.g., chassis 170 shown in FIG. 1A) hosts the flight controller 112, power assembly 118, and high-level computing device 114. One device selected for the flight controller 112 includes a PIXHAWK flight controller with an Intel UP Board serving as the high-level computing device 114. The high-level computing device 114 is used to relay the position and orientation data from an indoor motion capture system (which, in some embodiments, is external to the aerial robot 100) to the flight controller at 120 Hz for objects of interest within the flight arena. Analog pressure sensors of the plurality of sensors 116 (ASDXAVX100PGAA5, Honeywell International Inc., Morris Plains, NJ) and a micro diaphragm pump of the pneumatic assembly 102 (NMP830 HP-KPDC-B) are used to control the internal pressures of the frame balloon 166 and the grasper balloon(s) 186. The code associated with operation of the flight controller 112 is modified from the off-the-shelf code to accommodate the pneumatic assembly 102 and control allocation. The onboard micro-pump of the pneumatic assembly 102 is connected to the frame balloon 166 and grasper balloon(s) 186. In this work, the frame 106 was inflated up to 207 kPa and evaluated at intervals of 69 kPa. To fully re-open, the grasper balloon(s) 186 only required 83 kPa of pressure. The flight controller 112 connects to the pressure sensors of the plurality of sensors 116 and micro-pump of the pneumatic assembly 102 using I²C and Analog-Digital (AD) interfaces respectively. A standard proportional controller is implemented to control the pressure output from the micro-pump of the pneumatic assembly 102. 4S lithium polymer battery of 3300 mAh LiPo battery of 14.8V, 50C is used for the power assembly 118. The motors 144 of the propulsion assembly 104 are controlled utilizing Lumenier 30A BLHeli S Electronic Speed Controllers (ESCs) and the entire system has a maximum thrust-to-weight ratio of 4.58:1. The mass budget of the system is highlighted in Table S1. Noticeably, the soft robotic components and their mounting brackets make up only 19.7% of the entire system. Overall, the aerial robot 100 has a size of 319×319 mm and weighs 1.14 kg.

2.5 Modeling and Control of the Soft-Bodied Aerial Robot

FIG. 10 shows arm deflection modeling with respect to internal pressure for the frame 106 and the propulsion assembly 104. In particular, FIG. 10 shows arm deflection modeled as $\theta_i$ with respect to internal pressure to estimate a thrust loss coefficient of the aerial robot 100 that would occur due to bending of the frame member(s) 162. The rotor thrust is significant enough to introduce slight beam bending of the frame member(s) 162, which that affects net thrust and the overall flight performance of the aerial robot 100. To address this issue, the thrust coefficient is modeled as a function of the arm deflection angle $\theta_i$. The Euler-Bernoulli beam theory can be applied to calculate arm deflection angle $\theta_i$. This thrust coefficient is then applied within the controller to improve the flight performance.

For inflatable beams without wrinkles, the deflection angle, (9i, is calculated as:

$$y_{beam} = \frac{F_i l^3}{3EI}, \quad \text{Eq. 1}$$

$$\theta_i = \frac{F_i l^2}{2EI},$$

where l, $F_i$, and I are the arm length, thrust produced by the i-th motor, and area moment of inertia of the beam, respectively. $y_{beam}$ is the experimentally measured tip deflection as shown in FIG. 10.

The inertial reference frame is denoted by $\{i_1, i_2, i_3\}$ and the body fixed frame by $\{b_1, b_2, b_3\}$. From FIG. 10, the deflection angle, $\theta_i$, is then used to estimate the net effective thrust by:

$$f_i = F_i \cos\theta_i \quad \text{Eq. 2}$$

where $f_i$ denotes the effective thrust of the i-th propeller along the —$b_3$ axis and the thrust loss coefficient is approximated by $\cos\theta_i$. For the controller design, the controller inputs are considered as the total thrust and moments on the system, $\mu = [f\ M]^T$, which are related to the effective i-th motor thrust according to the following allocation matrix, A:

$$\begin{pmatrix} f \\ M \end{pmatrix} = \begin{pmatrix} 1 & 1 & 1 & 1 \\ 0 & -d & 0 & d \\ d & 0 & -d & 0 \\ -c_\tau f & c_\tau f & -c_\tau f & c_\tau f \end{pmatrix} \begin{pmatrix} f_1 \\ f_2 \\ f_3 \\ f_4 \end{pmatrix}, \quad \text{Eq. 3}$$

-continued $$\text{where } A = \begin{pmatrix} 1 & 1 & 1 & 1 \\ 0 & -d & 0 & d \\ d & 0 & -d & 0 \\ -c_\tau f & c_\tau f & -c_\tau f & c_\tau f \end{pmatrix}, N = \begin{pmatrix} f_1 \\ f_2 \\ f_3 \\ f_4 \end{pmatrix}$$

where d and $c_\tau f$ are the distance between vehicle COM to motor and coefficient for reaction torque, respectively.

The rigid body equations for the aerial robot 100 are therefore given by:

$$\dot{x} = v$$

$$m\dot{v} = mge_3 - fRe_3 \quad \text{Eq. 4}$$

$$\dot{R} = R\hat{\Omega}$$

$$J\dot{\Omega} = M - \Omega \times J\Omega$$

where m denotes the vehicle mass, $x \in \mathbb{R}^3$ and $v \in \mathbb{R}^3$ describe the position and velocity of COM in the inertial frame, $R \in SO(3)$ is the rotation matrix from the body-fixed frame to the inertial frame, $\Omega \in \mathbb{R}^3$ denotes the angular velocity vector in the body-fixed frame, g=9.81 m/s² denotes gravity acceleration, $e_3$ denotes the $i_3$ axis unit vector, $[0\ 0\ 1]^T$, and the hat map $\hat{\cdot}: \mathbb{R}^3 \to SO(3)$ is a symmetric matrix operator defined by the condition that $\hat{x}y = x \times y \forall x, y \in \mathbb{R}^3$.

A P-PID structure for the low-level position control loop with a geometric controller for the attitude control loop is employed for tracking control of the aerial robot 100. Equations (2) and (3) are then used to compute the individual motor thrust force ($F_i$) and the corresponding rotor speeds.

2.6 Trajectory Planning for Autonomous Perching

FIGS. 11A-11E show a sequence for a perching maneuver of the aerial robot 100, which includes multiple trajectories discussed in this section. Aspects of the perching maneuver can be applied by the processing element(s) 110, particularly by the flight controller 112. First, the aerial robot 100 approaches the target location and localizes itself to hover 30 cm above it. Once the position error is within the pre-defined tolerance, the aerial robot 100 initiates the descent trajectory. The reference trajectory for the descent includes only position setpoints. When the position errors with respect to the target perch location is approximately zero, the grasper 182 hits the target and activates to initiate the high-impact dynamic perching. After this event, as soon as the position and velocity errors are reduced below a user defined tolerance, the propellers are turned off to remain perched. A manual recovery is then performed by pneumatically disengaging the grasper 182 before the take-off and landing sequence. A block diagram representing a state machine for an autonomous perching task of the aerial robot 100 is given in FIG. 9 with the perching strategy highlighted in the orange sub-block.

Instructions within the memory (e.g., memory 340 shown in FIG. 26) can be executable by the processing elements 110 to: generate, based on information captured by the sensors 116 and with respect to a target position of a target object, one or more propulsion control signals for application to the propulsion assembly 104 based on a position and attitude control model; generate propulsion control signals for application to the propulsion assembly 104 that, when applied at the propulsion assembly 104, align the perching assembly 108 of the aerial robot 100 with the target object; and deactivate, following capture of the target object at the grasper 182 of the aerial robot 100, one or more propulsion elements 142 of the propulsion assembly 104.

Perching Task Planning: Due to the complexities in autonomous recovery control, autonomous perching with a manual recovery control is outlined. The entire perching maneuver includes multiple control strategies which are described in this section. The first trajectory involves a maneuver where the aerial robot 100 flies to the perching location to hover till the error in position is near zero and descends over the perching target with a specified downward velocity. This velocity is computed from a drop test by iterating over the height h which engages the grasper to achieve a successful perch. This also corresponds to the activation force (as computed in Sec. 3.1) for a impact time of about 0.1 s. Neglecting air resistance for low velocities, the impact velocity is calculated using:

$$v_t = \sqrt{2gh}$$

where $v_t$ is the impact velocity and g is the constant for acceleration and h is the height from which the platform is dropped. For the current system weight, the impact force generated by a free fall from a height of 30 cm is effective to engage the grasper successfully and the corresponding impact velocity is approximately 2.4 m/s. The reference trajectory for the downward descent are therefore chosen as the x–y coordinates of the perching target and the z-direction velocity for the cascaded P-PID low level position controller.

3. Results

3.1 Evaluation Setup

FIGS. 12-24E are directed to evaluation of the aerial robot 100 shown in FIGS. 1A-11E.

To characterize the grasper balloon(s) 186, frame balloon 166, and deflection characteristics of the aerial robot 100, a universal tensile testing machine (UTM) (Instron 5944, Instron Corp., High Wycombe, United Kingdom) was used. A 500 fps high-speed camera (Edgetronics SC1, CA, USA) was used to monitor the collision and drop tests, and the activation time of the perching assembly 108. To set up the drop tests, frames were mounted on the UR5 robot manipulator, with a controlled Hand-E grasper (Universal Robotics, Odense, Denmark). To monitor the peak impact accelerations of the drop tests, a high-G accelerometer SparkFun H3LIS331 DL (Sparkfun, Boulder, Colorado), with a maximum reading of 400 G, was utilized. The high-G accelerometer was capable of measuring acceleration at 1 kHz sampling rate. Finally, the indoor perching experiments were performed utilizing a Vicon motion capture system (OptiTrack, NaturalPoint, Inc., Corvallis, OR) to obtain the position and orientation information of the aerial robot 100 and the perching location. The stiffness (e.g., internal pressure) of the frame 106 of the aerial robot 100 was varied by modifying the internal pressure increments of 69 kPa, from 69 kPa up to 207 kPa, throughout the experiments.

3.2 Grasper Evaluation

To characterize the performance of the perching assembly 108, each grasper 182 was evaluated for its tip force, activation force, and activation and recoil time. A triple spring steel set was used for creation of one embodiment of the bistable spring element 184, which is found to generate a grasping force of 200 N and a tip force of 0.55 N, activate within 4 ms, and pneumatically recoil within 3 s with a minimum input pressure of 83 kPa. The activation force tests enabled approximation of a desired impact velocity. With an impact time of approximately 0.1 s (captured by the 500-fps highspeed camera), the triple spring steel set leads to a minimum approach velocity of 2.4 m/s, which corresponds to a free-fall drop height of approximately 30 cm. This insight is effectively employed to demonstrate successful perching.

Figures 6A, 6B, 6C, 6D:
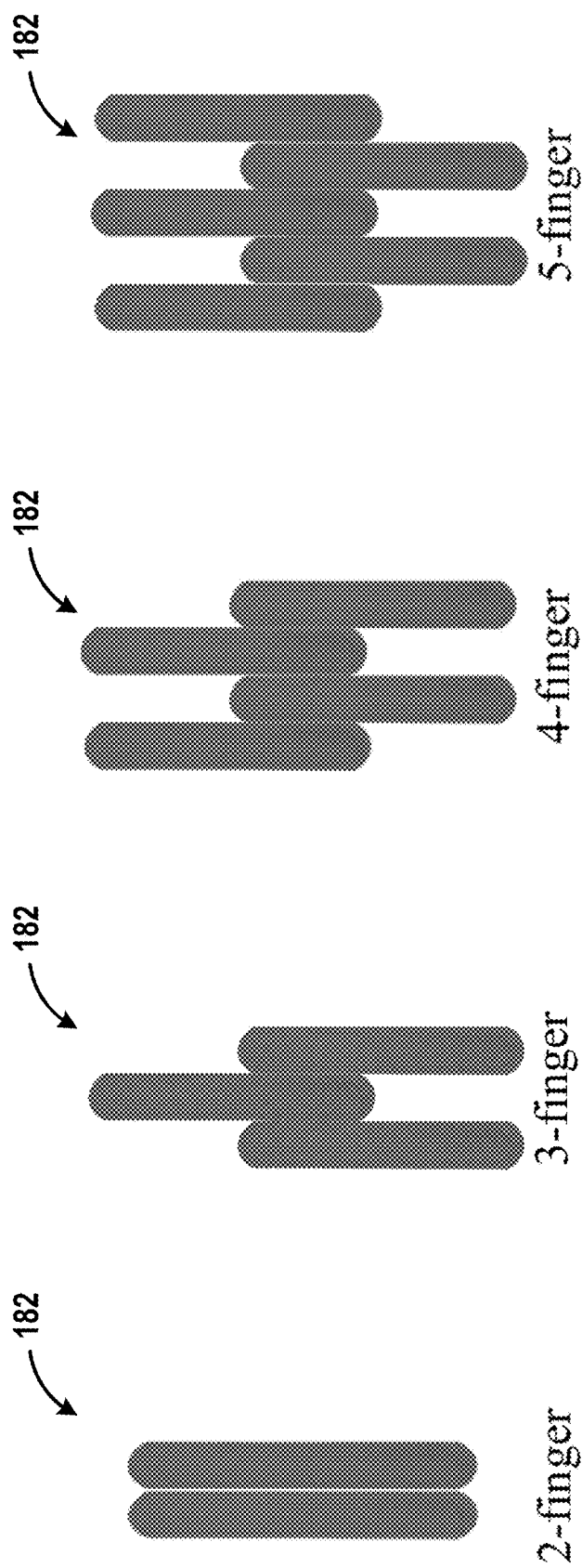
FIGS. 6A-6D are a series of illustrations showing various grasper configurations for the perching assembly of the aerial robot of FIG. 1A, including 2-finger, 3-finger, 4-finger and 5-finger grasper configurations.
Figure 7B:
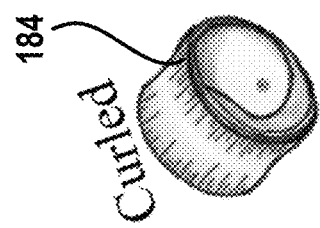
FIG. 7B shows the bistable spring element of the grasper of FIG. 7A in the second closed state.
Figure 7A:
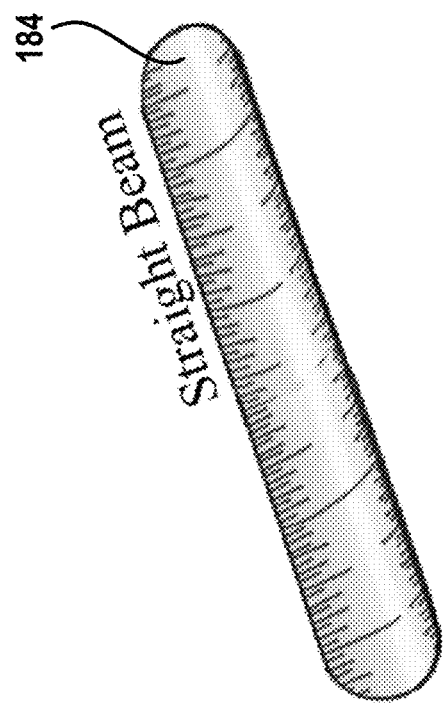
FIG. 7A shows a bistable spring element of the grasper of FIG. 4A in the first open state.
Figure 12:
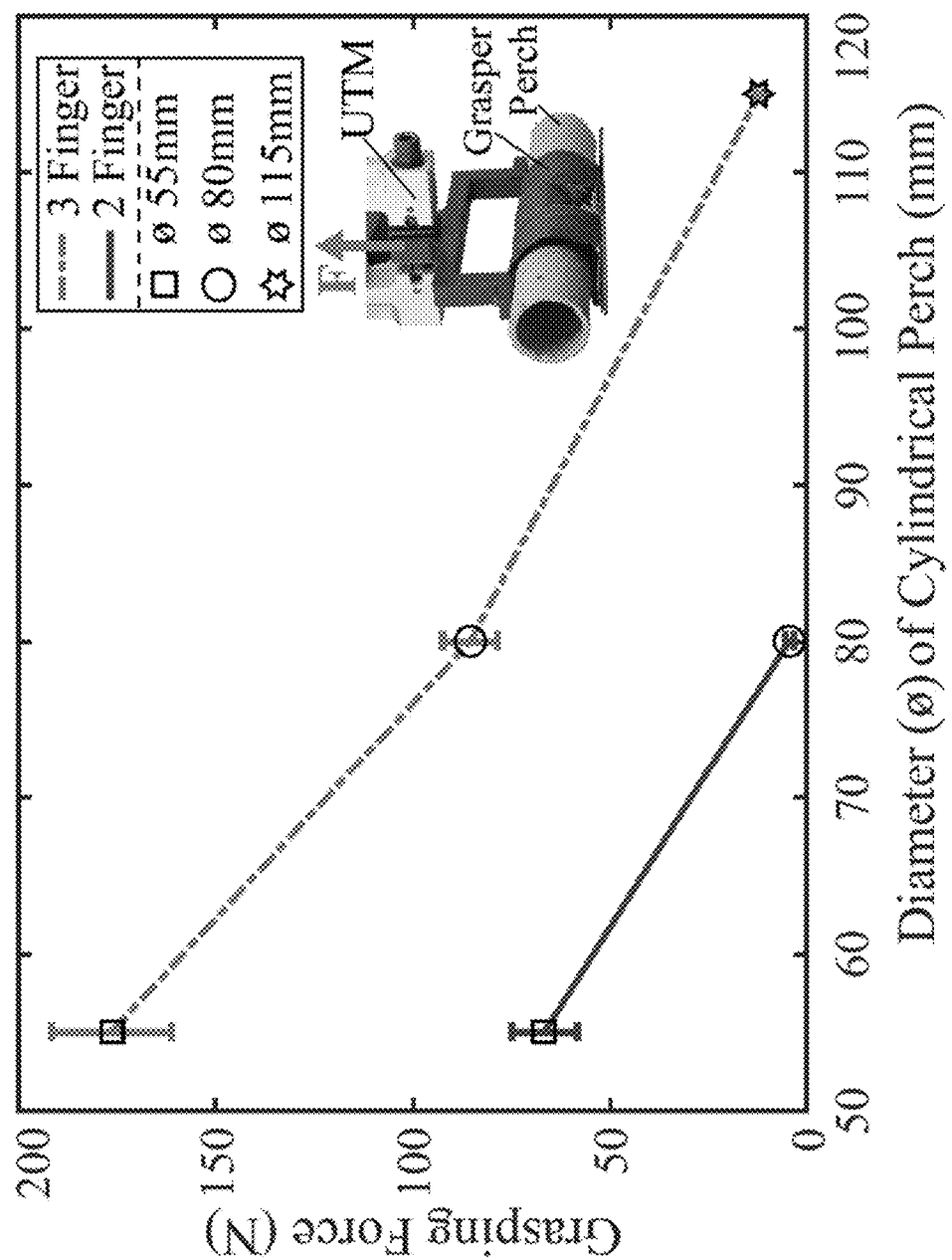
FIG. 12 is a graphical representation showing grasping forces of the perching assembly of the aerial robot of FIG. 1A with respect to a diameter of a (cylindrical) perching surface.

The experiments were designed with UTM for evaluating the grasping force of the perching assembly 108 for perching. The maximum grasping force was tested for the two- and three-fingered actuator configurations, as seen in FIGS. 6A and 6B. For each configuration, experiments were conducted on three cylinder diameters (55 mm, 80 mm and 115 mm), chosen based on various perch sizes of interests. The graspers 182 were fixed in place in a horizontal position while the cylinders were pulled upwards at a rate of 8 mm/s. As soon as slip was detected, the grasping force was recorded, as shown in FIG. 12.

For the two-fingered grasper configuration, the grasping capacity is observed as 66.58±7.39 N and 4.44±1.02 N for the 55 mm and 80 mm diameter cylinders, respectively. For the three-fingered grasper configuration, the grasping force on the 55 mm, 80 mm and 115 mm diameter cylinders is 176.43±12.46 N, 85.4±5.55 N, and 12.06±1.53 N, respectively. One can notice that both configurations struggle to maintain grasp with the 115 mm diameter cylinder because they are not able to maintain an envelope grasp around it.

In order to study the grasping force for objects that do not conform to the grasper workspace, a static wrench analysis is further detailed herein. With objects within its grasp radius, the perching assembly 108 has a higher chance of resisting the external wrench in order to perform a successful grasp.

3.3 Single Grasper Evaluation

Figure 13A:
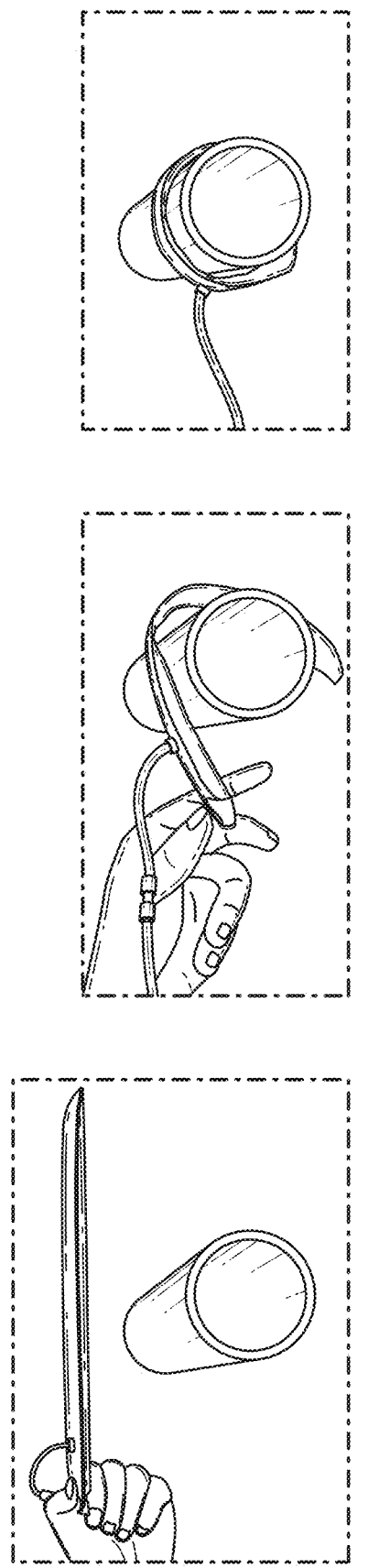
FIG. 13A shows passive actuation of the grasper of FIG. 4A between the open state and the closed state.
Figure 13B:
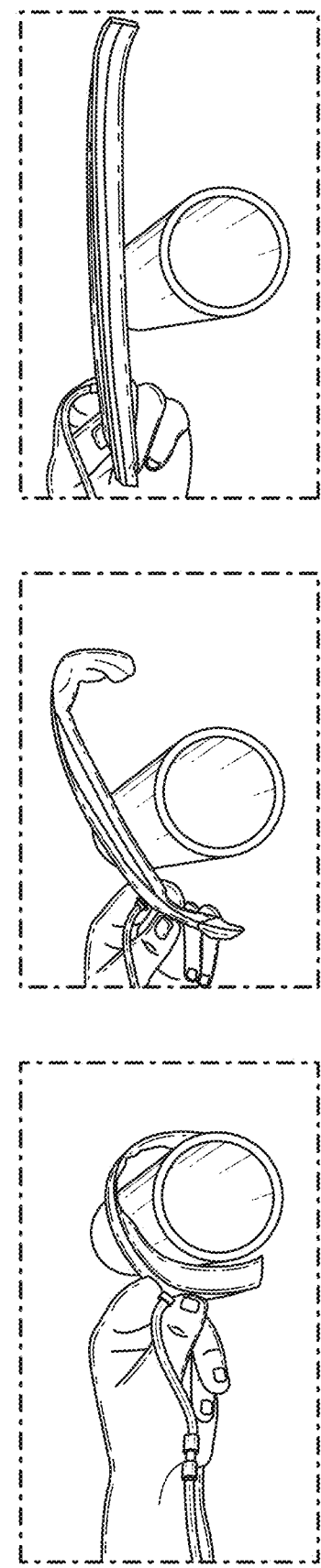
FIG. 13B shows transitioning of the grasper of FIG. 13A between the closed state and the open state.

Single Grasper Activation and Recovery Time: This test evaluated the time taken for each grasper 182 to transition from the "open" state to the "closed" state (e.g., activation) and pneumatically recover the grasper 182 from the closed state back to the open state, as shown in FIGS. 13A and 13B. To do so, the time sequence was tracked using a high-speed camera at 500 fps. Pressure to transition to the open state was set at 83 kPa, which is the minimum pressure required for the bistable spring elements 184 to transition, ascertained from prior trial-and-error testing. From the high-speed footage, the activation stage was observed to take only 4 ms and the pneumatically actuated recovery stage to take 3 s.

Single Actuator Tip Force: A single grasper 182 was utilized to evaluate the actuator tip force, using the UTM. The tip of the grasper 182 is placed in contact with the UTM's load cell. The grasper 182 is then activated at the proximal end, and the tip force is measured. The tip force of the grasper 182 with a single-layered spring steel is 0.16 N and that with three-layered embedded spring steels is 0.55 N. From the activation force, the approximate desired impact velocity can be determined. The impact time is approximately 0.1 s as visualized by the high-speed camera, leading to impact velocities of 0.7 m/s, 2.4 m/s, and 5.4 m/s in the body z direction of the aerial robot 100, for the single, triple, and quintuple embedded spring steels graspers, respectively. For real-world experiments, the grasper configuration with three embedded spring steels was used to optimize parameters including required impact velocity, achieved grasp force and total weight addition.

3.4 Static Wrench Analysis of the Grasper for Non-Conformable Objects

A static grasp wrench analysis illustrated in FIGS. 14A-14E is provided to obtain insight into whether the aerial robot 100 with the perching assembly 108 will successfully perch on objects, with shapes and sizes, that do not conform to the grasper workspace. For the wrench analysis, assume a 2D object and the wrench space in $\mathbb{R}^3$, neglecting any movement in longitudinal direction of the perching object.

Figure 14A:
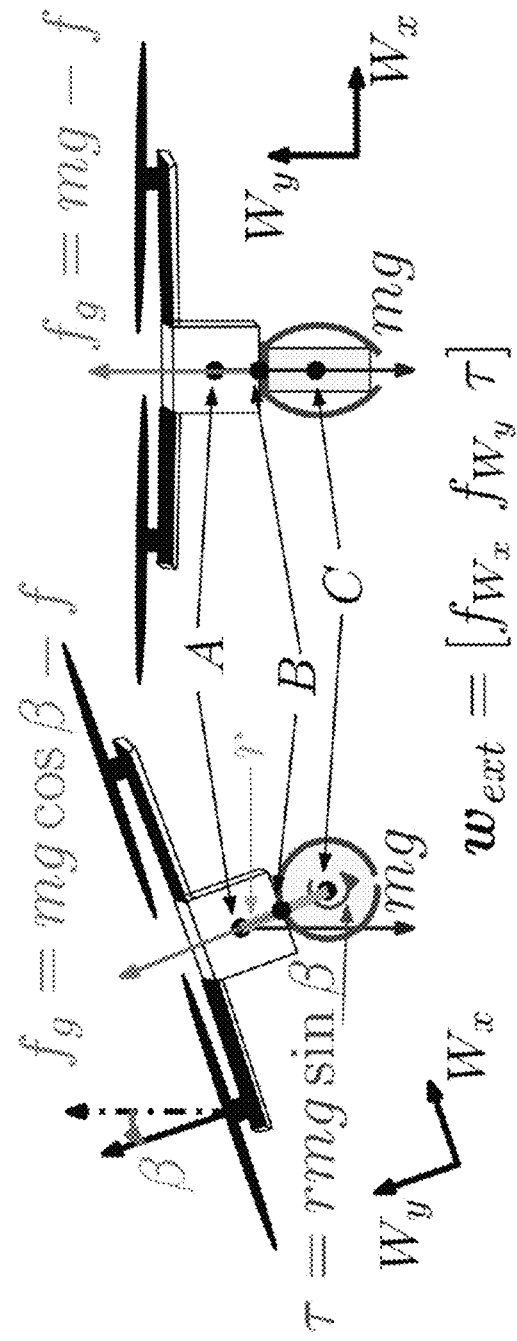
FIGS. 14A-14E are a series of free-body diagrams for analysis of wrenching forces for the grasper of FIG. 4A.

FIG. 14A illustrates the external wrench on the grasper in different scenarios (objects with circular and rectangular cross-sections) and the reference wrench frame, W, which is located at the center of the grasper and oriented with the $b_3$ axis. The gravitational force (mg) acting on the center of gravity of the aerial robot (Point A) and the reaction force ($f_g$) acting at the point of contact (Point B) is transferred to Point C, the center of the object. Note that the reaction force compensates for any residual thrust from the motors, denoted in the figure by f. For the circular cross-section, there is an acting torque at Point C due to the perch orientation but for the rectangular cross-section, the external wrench can include the contact forces and gravitational forces, excluding any torques, due to the flat surface on which the aerial robot perches. In order to ensure a successful perching, the maximum force by the grasper should be able to generate an equal wrench in the opposite direction. For the analysis that follows, the friction coefficient, between the high-friction grip material used on the grasper and the cardboard material of the perching object is taken as 0.7 as calculated from experiments.

Figure 14B:
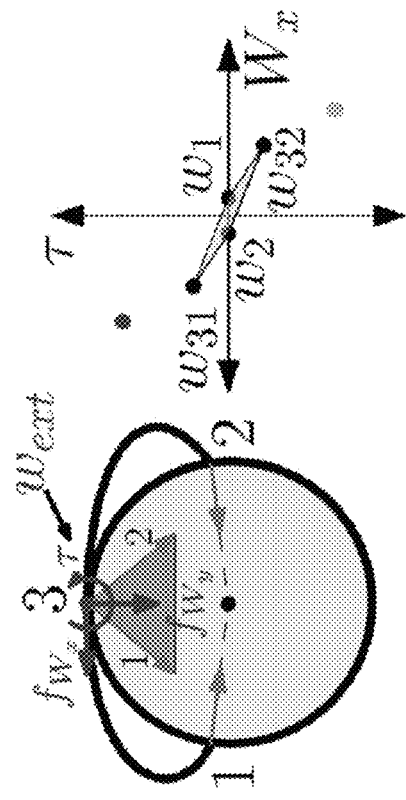
Figure 14E:
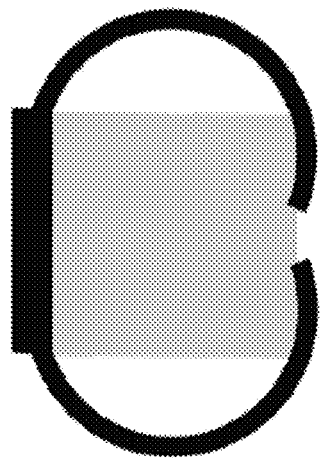

First consider a scenario where the aerial robot perches on a circular object with a diameter (115 mm) greater than the workspace of the two-finger grasper (70 mm). With the values:

$$m = 1.14 \text{ kg}, \beta = 30°, g = 9.81 \text{ m/s}^2$$

and $$r = r_{AB} = r_{BC} = \left(50 + \frac{115}{2}\right) \text{ mm} = 107.5 \text{ mm}$$

components of the external wrench, $w_{ext}$, can be calculated as:

$$fw_x = -mg \sin \beta = -5.59N, 0 \leq fw_y \leq (mg \cos \beta - f)$$

and $$\tau = 0.6 \text{ Nm},$$

where f is residual thrust during perching and is significantly less than mg. To compute the grasp wrench hull, one can assume that there are three forces as shown in the free body diagram of FIG. 14B. The forces are approximated as follows—a friction cone at point "3" and two frictionless point forces at locations "1" and "2" respectively which are directed towards the center of the object. To account for the curled tip force that is not exactly directed towards the center, a loss cone of ±5° is approximated within which the tip force lies. Depending on the grasp wrench hull, one can determine if the external wrench can be compensated by the grasper in the configuration for a large object as shown in FIG. 14B.

With the above-mentioned parameters, the following can be obtained:

$$f_{g_{max}=mg \cos \beta=} 9.68$$

Using the tip force values as calculated from experiments and neglecting the small torque generated by these forces:

$$f_1 = -f_2 = 0.55N,$$

and $$f_{31} = -f_{32} = \mu f_{g_{max}} = 6.78N$$

with a friction cone of angle:

$$\alpha = \tanh \mu = 35°$$

The wrench generated by the grasper can now be calculated as:

$$w_1 = [0.54 - 0.10]^T,$$
$$w_2 = [-0.54 - 0.10]^T,$$
$$w_{31} = [-f_{31}\sin\alpha f_{31}\cos\alpha r_{BC} f_{31}\sin\alpha]^T = [-3.88 \quad -5.55 \quad 0.22]^T$$

and similarly:

$$w_{32} = [3.88 - 5.55 - 0.22]^T.$$

It can be inferred that no linear combination of the grasper forces can cancel out the external wrench. As shown in FIG. 14B, the required wrench (the yellow dot) falls outside the wrench hull in this case, and hence leads to an unstable perch. This is accounted by the fact that the grasper cannot generate required force and torque in this configuration to cancel out the external wrench's component in $W_x$ direction and τ.

Figure 14D:
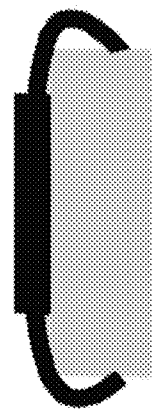
Figure 14C:
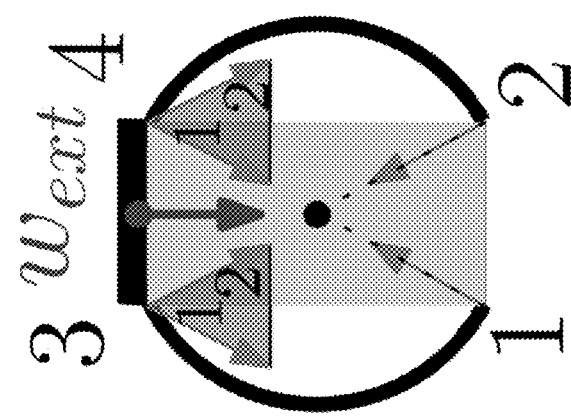

One can proceed in a similar way to model the grasp wrench for one narrow side rectangular object which lies within the grasp radius (20 mm×40 mm). Here, consider a total of four forces—two friction cones at the two top corners as shown in FIG. 14C and two frictionless point forces at the tip of either end of the grasper. In this case however, there is no external torque acting after the perching maneuver and the ground reaction force helps counter the gravitational forces on the body. With the aforementioned parameters and assuming that all the tip forces at 1 and 2 act towards the center of the object, as shown in the figure, each wrench force can be computed as mentioned in previous section. Specifically, the forces are calculated to be:

$$f_1 = [0.26\sqrt{2} 0.26\sqrt{2}]^T,$$
$$f_2 = [-0.26\sqrt{2} 0.26\sqrt{2}]^T,$$
$$f_{31} = f_{41} = [-4.49 - 6.41]^T,$$
$$f_{32} = f_{42} = [4.49 - 6.41]^T.$$

The grasper can resist small arbitrary forces in this configuration since the origin lies within the wrench hull. Note that, if the object is larger than the grasp radius, as shown in FIG. 14D, the ground reaction force can help stabilize the perching assembly after perching, given a flat final orientation. For objects that do not conform to the size but lie within the grasp radius, such as in the illustration of FIG. 14E, the grasper can effectively generate forces to hold on to the perch and resist take-off. This configuration can be modelled as four friction forces, two at the top point of contact and two friction forces at the bottom pints of contact which ensures that the configuration is in force closure. These successfully employ these insights to demonstrate real-time experiments with the aerial robot 100 on objects that ensure successful perches.

3.5 Evaluation of Soft-Bodied Frame

Figure 15:
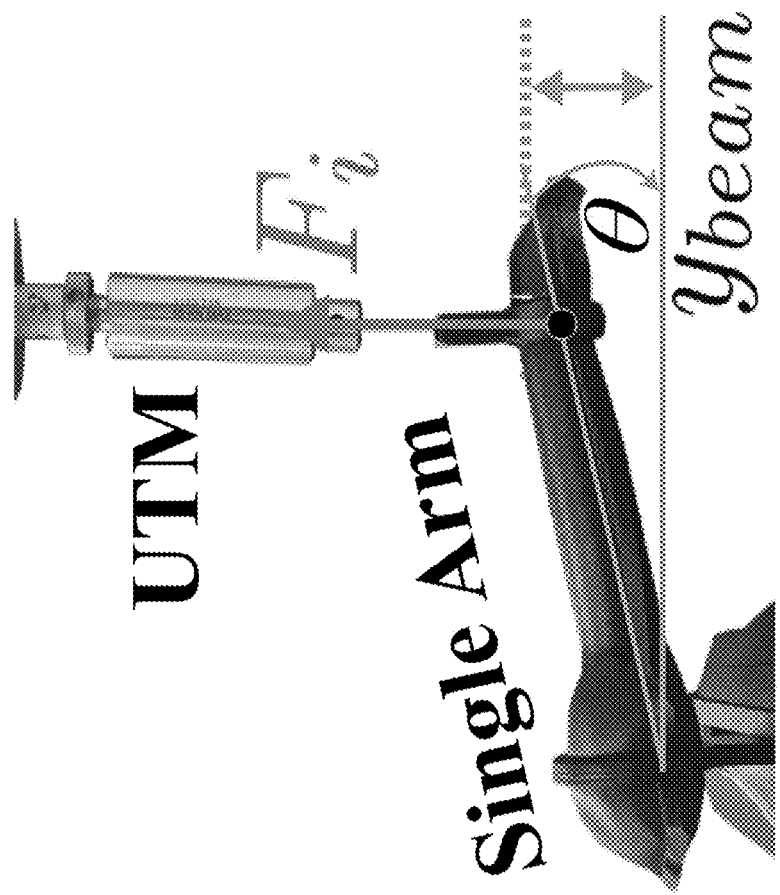
FIG. 15 is a diagram showing a UTM test to calculate a bending moment acting on a single frame member of the aerial robot of FIG. 1A.

Maximum Bending Deflection: A bending test was performed to calculate the maximum beam deflection of the frame 106 due to the motor thrust at different internal pressures. The UTM was used to simulate the motor thrust as shown in FIG. 15. With the chosen motor-propeller pair (e.g., as propulsion elements 142 of the propulsion assembly 104), a maximum thrust of 10 N was generated by each motor and hence, the UTM was programmed to pull one end of the beam until it reached 10 N. The deflection at 10 N was averaged across 10 trials and denoted in FIG. 15. Approximating the arm as a circular cross-section for the moment of inertia such that $$I = \frac{1}{4}\pi r^4,$$

and with $F_i=10$ N, $l=18$ mm $r=15$ mm, Equations (1) and (2) were employed to calculate the Modulus of Elasticity (E) and corresponding tip deflection angle ($\theta_i$) for various internal pressures as summarized in Table 2. One can see the least deflection at $y_{beam}=12$ mm, which corresponds to a deflection angle of $\theta_i=5.8°$ at 207 kPa and the largest deflection at 69 kPa with $\theta_i=14.93°$.

Figures 16A, 16B, 16C:
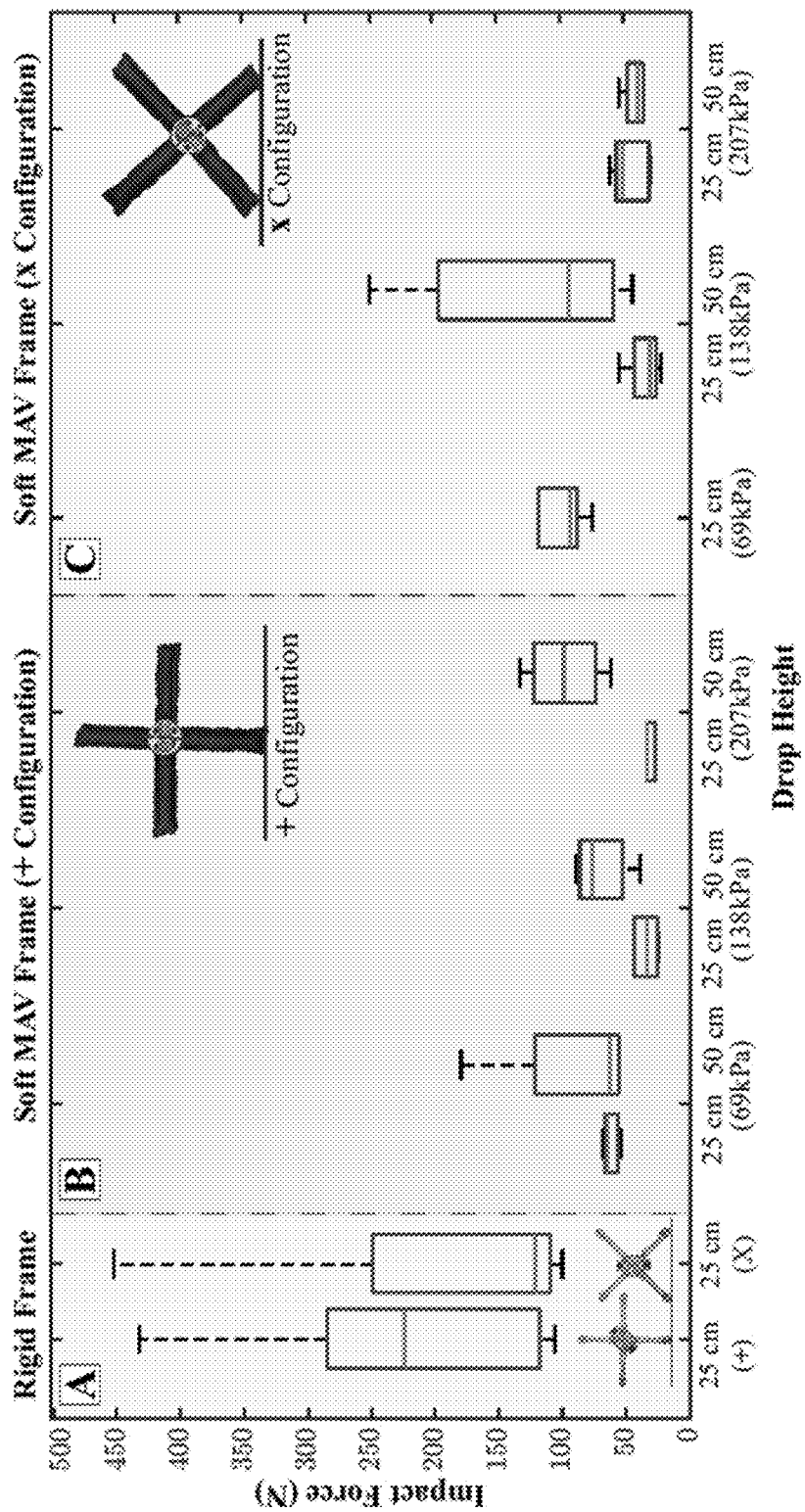
FIGS. 16A-16C are a series of graphical representations showing impact forces with respect to drop height, respectively corresponding to results for a rigid frame and two configurations of the aerial robot of FIG. 1A (including a "+" configuration and an "X" configuration)
Figure 17A:
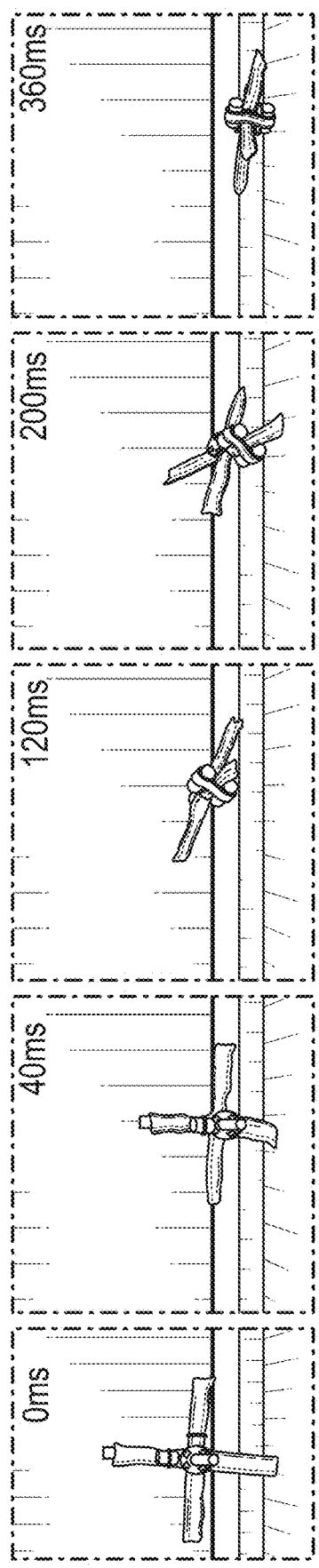
FIG. 17A shows a sequence captured during a drop test of the aerial robot of FIG. 1A having the "+" configuration.
Figure 17B:
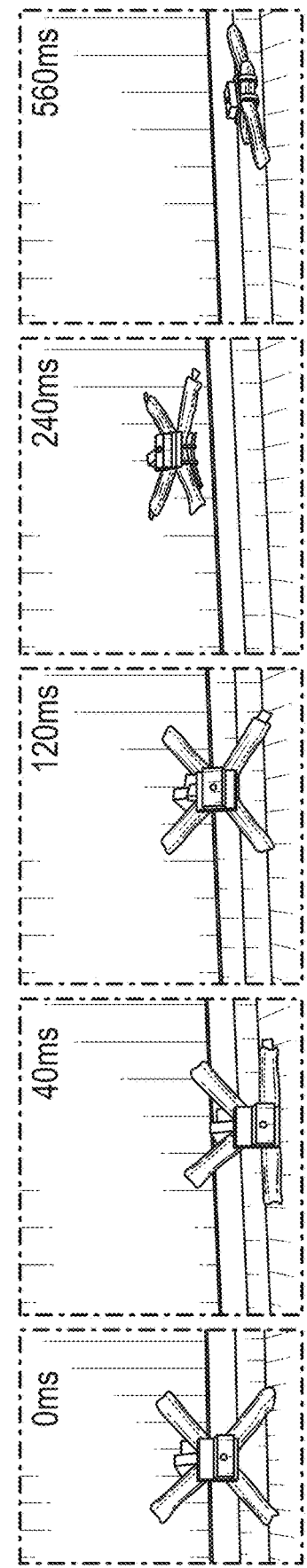
FIG. 17B shows a sequence captured during a drop test of the aerial robot of FIG. 1A having the "X" configuration.
Figure 18A:
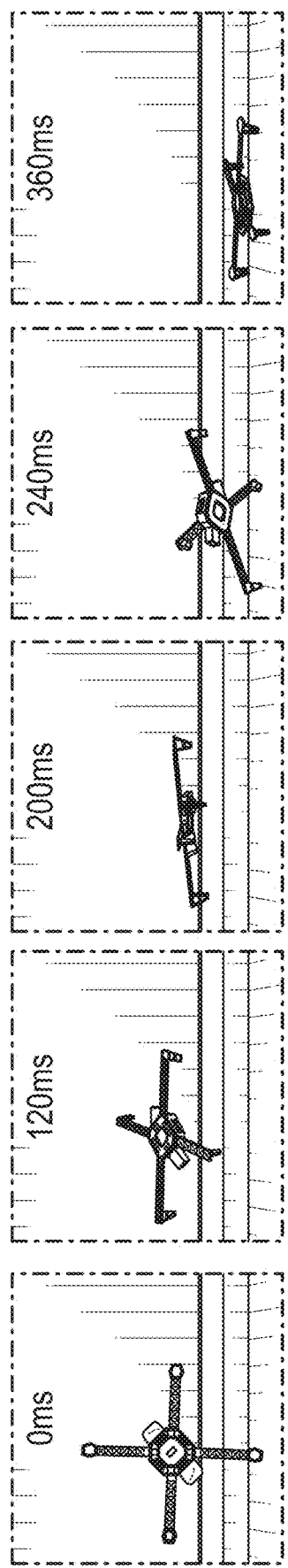
FIG. 18A shows a sequence captured during a drop test of the rigid frame having a "+" configuration.
Figure 18B:
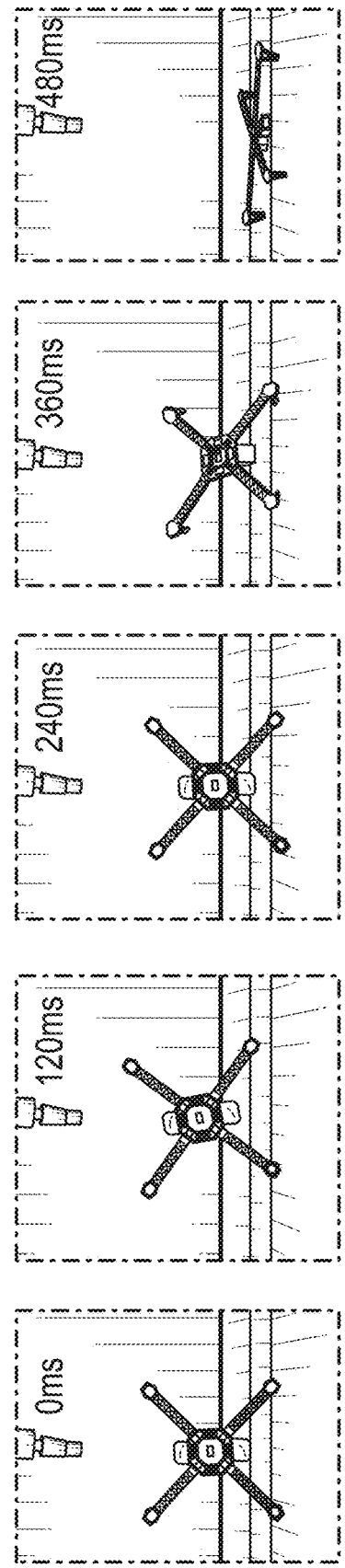
FIG. 18B shows a sequence captured during a drop test of the rigid frame having a "+" configuration.
Figure 19A:
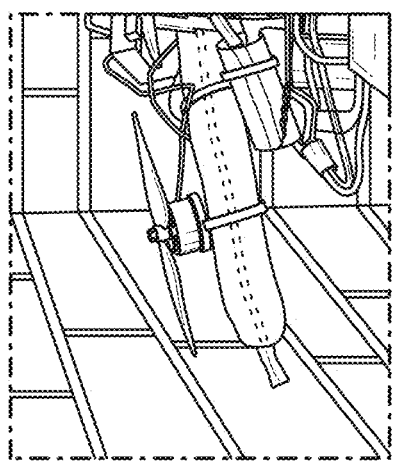
FIGS. 19A-19E show a sequence of images captured of the aerial robot of FIG. 1A during a wall collision.
Figure 19B:
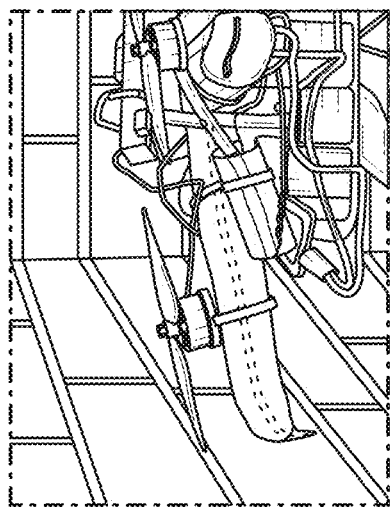
Figure 19C:
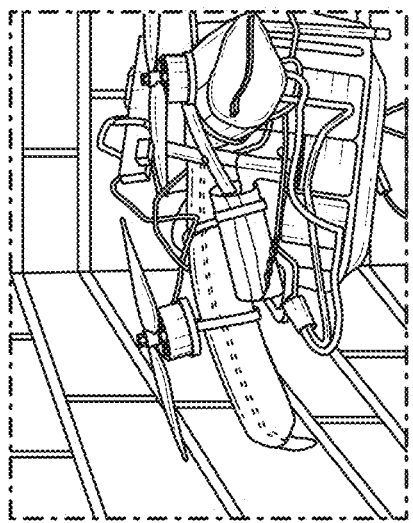
Figure 19D:
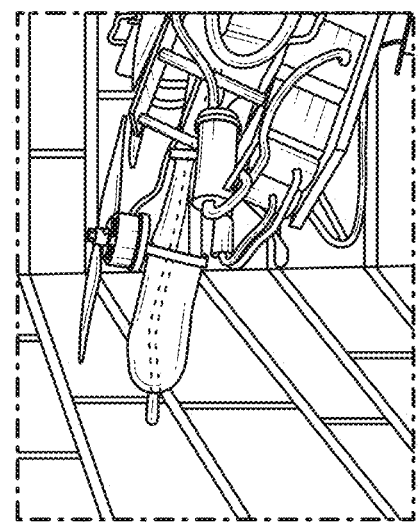
Figure 19E:
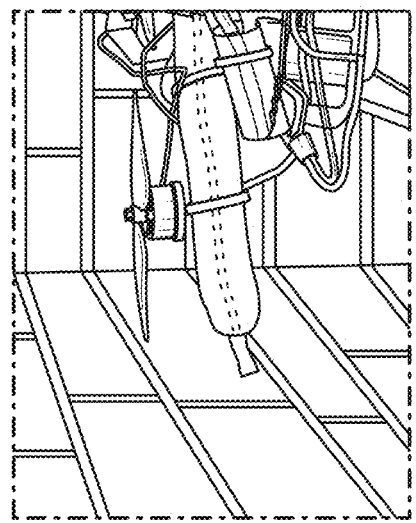

Collision Drop Tests: To test the collision resilience of the frame 106 of the aerial robot 100, comparative drop tests were performed with a rigid DJI F450 frame and the impact times and peak accelerations of the frame 106 (in "+" and "×" configurations) were recorded. The drops were also evaluated at two different set heights of 25 cm and 50 cm corresponding to two different impact velocities of 2.21 m/s and 3.1 m/s respectively. The impact times were captured with a highspeed camera. The results are shown in FIGS. 16A-16O, and summarized in Table 2. FIGS. 17A-18B represent the experimental setup utilized and is further detailed above. Slow motion frame captures of a single drop test for the "+" and '×' configurations of the soft-bodied frame at 138 kPa, are shown in FIGS. 17A and 17B. It is also similarly displayed for the rigid frame in FIGS. 18A and 18B.

TABLE 2

Deflection Characterization at Different Internal Pressures

| Pressures (kPa) | $y_{beam}$ (mm) | $\theta_i$(°) | E (MPa) |
|---|---|---|---|
| 69 | 31.3 | 14.9 | 0.016 |
| 138 | 20.8 | 9.9 | 0.018 |
| 207 | 12.2 | 5.8 | 0.041 |

For the rigid frame, the impact time for the "×" and "+" configurations was approximately 22 ms and 8 ms. The maximum peak acceleration experienced by the rigid frame was approximately 390 m/s², corresponding to a very high peak impact force of 430 N, as seen in FIG. 16A. These high impact forces were experienced by the chassis because the rigid frame does not deform, transmitting the entire impact force to the main body. It is hypothesized that the large variance in impact force readings is due to the impact times being so miniscule, that, at the current sampling rate of the sensor (maximum of 1 kHz), it would sometimes miss the peak acceleration reading. On the other hand, the frame 106 of the aerial robot 100 deformed upon collision, which led to much longer impact time (10× in both configurations) compared to that of the rigid frame. The frame 106 of the aerial robot 100 is capable of extending the contact impact time through its body deformation, which leads to lower impact force as shown in FIGS. 16B and 16C.

Between the "+" and "×" configurations of the frame 106, one can notice that the "+" configuration experiences lower impact forces overall. Although the "×" configuration highlights longer impact times, as seen in Table 2, its arms mitigate the impact by splitting outwards which can be less ideal for collision mitigation. For example, FIG. 16B highlights the experiment with the aerial robot 100 frame that experienced the largest recorded impact forces at 138 kPa and 50 cm, also captured in FIG. 17B. One can notice that at 120 ms, the arms have completely split outwards, causing the chassis 170 to impact the ground, thus leading to high impact forces. This behavior is even worse with the 69 kPa frame when dropped at 50 cm, saturating the on-board accelerometer. This behavior is analogous to Euler springs where beyond the maximum compression distance, the entire impact force is transmitted to the chassis. However, by increasing the internal pressure of 207 kPa, even at the 50 cm drop, the "×" configuration is able to successfully mitigate the impact without the main chassis contacting the ground.

Since indoor aerial robots are prone to collisions with impact velocities up to 2 m/s, the "+" configuration at 207 kPa was selected to maximize the collision mitigation ability and minimum thrust loss for the collision and flight demonstrations with the aerial robot 100.

3.6 Collision Demonstration

To verify the collision performance of the aerial robot 100, a series of experiments were carried out where the aerial robot 100 took off and approached the target setpoint without the knowledge of the wall. Upon collision, the aerial robot 100 recovered and the collision trajectory was recorded in slow motion, as seen in FIGS. 19A-19E. It is seen that due to the deformation of the frame 106 of the aerial robot 100, low rebound velocities in the range of 1.5 m/s corresponding to high collision velocities of up to 2 m/s are achieved. These low rebound velocities help in post-collision recovery control without the need for complex collision characterization. For the conventional rigid chassis, the rebound velocities are significantly higher, as observed through experimental tests that were also captured with the high speed camera, leading to complex collision characterization and recovery control.

3.7 Perching with the Soft-Bodied Aerial Robot

Figure 20A:
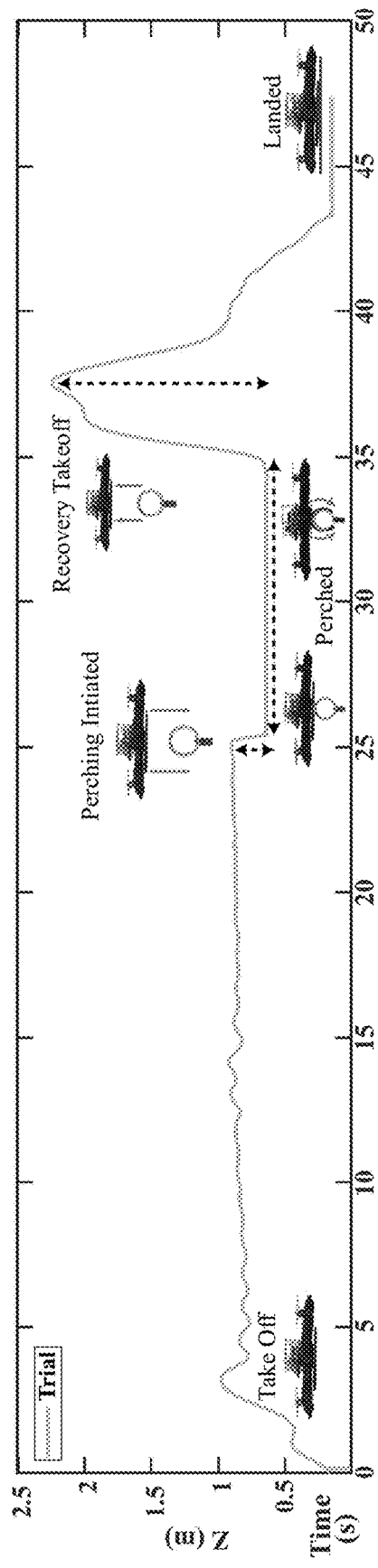
FIG. 20A is a graphical representation showing a takeoff, perch, recover and land sequence of the aerial robot of FIG. 1A with a circular perching surface.
Figure 20B:
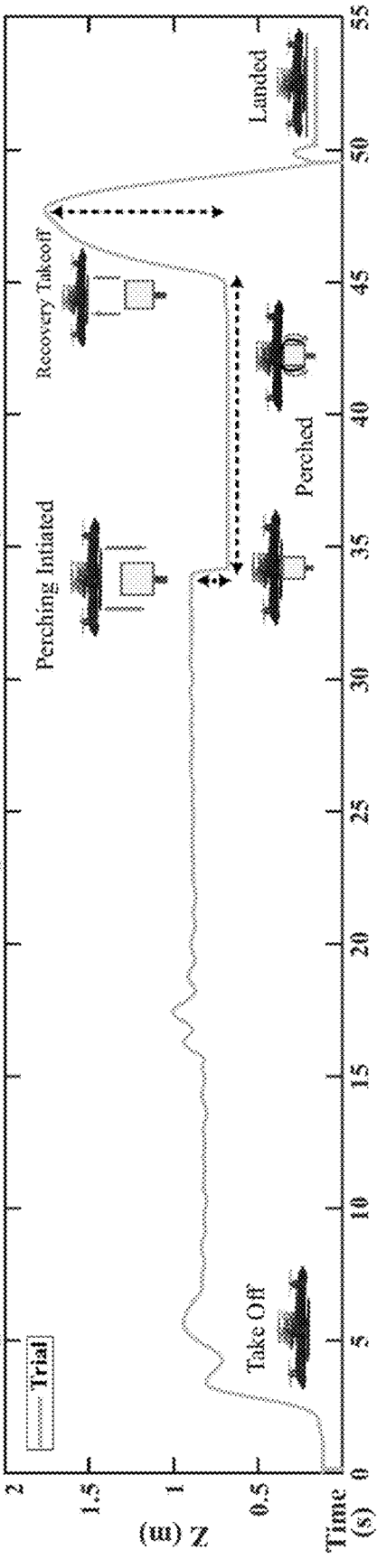
FIG. 20B is a graphical representation showing a takeoff, perch, recover and land sequence of the aerial robot of FIG. 1A with a rectangular perching surface.

Real-time Experiments: The z-position trajectory of the aerial robot 100 for real-time perching is shown in FIGS. 20A and 20B. This coordinate was chosen to mark the various phases of the maneuver, as shown in the FIGS. 20A and 20B. The perching ability of the aerial robot 100 was demonstrated on a cylindrical and rectangular cross-sectioned objects. Initially, the aerial robot 100 approaches and hovers above the target location, which is obtained by placing an infrared marker on the perching object. This hover phase is marked where the height is oscillating due to small errors in the tracking control. Once the position errors fall within the preset bound, the free-fall descent is initiated for perching, this is shown by the steep slope of the z-position trajectory. After the successful perch, the aerial robot 100 rests for a user defined wait time, and then performs a manual recovery and landing sequence. The perching results on the two different objects are shown in FIGS. 20A and 20B, respectively. As previously mentioned, since the object radius is within the maximum grasp radius, significantly high success rates were observed (four out of five times). FIGS. 21A-21E and 22A-22E highlight snapshots of the experimental setup and the real-time perching, recovery, and landing maneuvers for different shapes of the perching surface (e.g., where FIGS. 21A-21E show a cylindrical perching surface and where FIGS. 22A-22E show a "2×4" perching surface).

3.8 Perching with Rigid vs. Soft-Bodied Frame

The perching ability was compared between the aerial robot 100 and rigid DJI, both including the perching assembly 108. The aerial robot 100 and rigid DJI were dropped from a height of 25 cm onto a circular percing surface, as seen in FIGS. 23A-23E and 24A-24E. For the rigid frame, one can notice that the impact times are significantly smaller (2-4 ms) leading to higher impact forces. These forces are large enough to not only activate the graspers 182, but also cause a rebound motion, as shown in FIGS. 23B and 23C, which causes the rigid DJI) to bounce off the perch, before the graspers 182 can successfully engage, as shown in FIG. 24C. As the graspers 182 are already partially activated, the friction on the graspers 182 helps the rigid frame from completely falling off. However, because of the uneven application of wrench forces, there is noticeable slippage, seen in FIG. 23D, until enough contact is reached in FIG. 23E. This leads to unpredictable final configurations, as shown in FIG. 23E (roll angle almost 90°), which can be difficult to recover from. The success rate for this case scenario was one out of five.

With the frame 106 of the aerial robot 100, and with reference to FIGS. 24A-24E, one can notice that upon impact, the aerial robot 100 undergoes deformation and increases its impact time as shown in FIGS. 24C-24E. This allows contact with the perch for a longer time, leading to successful engagement of the grasper 182 with little to no rebound motion, maintaining contact the entire time. The aerial robot 100 was able to successfully perch four out of five times. This highlights how the frame 106 of the aerial robot 100 improves the perching capabilities in comparison to rigid frames, and aids in the mitigation of the wrench forces without explicit grasp hull computations. As such, the aerial robot 100 maintains a robust grasp during the perching task.

4. Discussions and Conclusion

The present disclosure provides information for the design, development, and evaluation of the aerial robot 100. The vision of this work was geared towards addressing two previously disconnected capabilities in aerial robots, namely, impact mitigation and dynamic perching. Towards this goal, the present disclosure provides systems and methods for an intrinsically soft aerial frame, with embodied physical intelligence, which includes high robustness, light weight, and tunable stiffness for flight stability and collision resiliency. Equipped on the bottom of the soft-bodied frame, the grasper 182 utilizes bistability to passively switch from a landing gear (straight beam, or "open" state) to grasper (continuum curled, or "closed" state), maintaining both states without any additional activation but utilizes pneumatic activation to return from a curled to a straight beam state. The frame 106 and the grasper 182 synergistically assist each other to perform highspeed, high-impact, and dynamic collision-based perching by mitigating the free-fall drop impact to extend the robot's contact time with the perch and support the activation of the grasper 182 within 4 ms.

In particular, the soft-bodied frame design took into consideration the innate features of high-strength inflatable woven fabric beams to maintain a lightweight of 10 g, while still being able to adapt its stiffness pneumatically to achieve high stiffness during flight. Yet, when completely deflated, the aerial robot 100 is completely stowable and storable. With the utilization of a soft-bodied frame, at the internal pressure of 207 kPa, a beam deflection of approximately 5.80° was observed, which affected the net thrust force and the flight efficiency of the aerial robot 100. This was accounted for by modeling the thrust coefficient as a function of this deflection angle for controller design. The overall stiffness of the frame can be further improved by employing an onboard pump rated at a higher operating pressure, since the maximum burst pressure of the frame is rated at approximately 345 kPa. Rigid reinforcements can also be added at the joints of the frame's arms to limit the deflections.

The experimental results demonstrated the soft-bodied frame's ability to mitigate impact from head-on collision with a series of comparative drop tests. Vastly improved collision mitigation abilities were observed, in both plus and cross configurations. The stiffness model for the frame 106 can further optimized as a function of the internal pressure that generates the desired stiffness for collision resilience based on the robot's approach velocity during a head-on collision. A successful recovery of the aerial robot 100 from head-on collisions at a speed up to 2 m/s was also demonstrated through the experimental results. After numerous collision tests, the mounting interfaces 174 on the frame members 162 of the aerial robot 100 (shown in FIG. 10) had to be readjusted due to minor slippage. This might be addressed by adding anti-slip fabric at the interface between the motor mount and the frame 106. In addition, the mounting interfaces 174 could be sewn directly onto the frame 106 with minor sacrifice of stowability.

The design considerations taken for the grasper 182 included its speed of grasp, shape of grasp, payload capacity, and passive contact-reactive nature. For the successful implementation of the grasper 182, the present disclosure provided a system that did not require active control based on the timing of the robot's perching performance, but instead, reacts instantly upon contact with the perch. The grasper 182 is contact-reactive and converts the impact energy to rapidly switch states in less than 4 ms. Its shape conforming nature enables it to adapt to unknown surface geometries and textures, demonstrated with the cylindrical pipe and rectangular prism log in this work. The grasper 182 demonstrates grasping forces of up to 200 N, around a 55 mm circular perch, which is more than 500% its own weight. The grasping payload of the system is related to the number of bistable spring steels utilized, which was three in this work. The limitation of scaling up the number of spring steels directly correlates to the minimum approach speed of the robot, which was theoretically calculated and then characterized as a downward velocity of 2.4 m/s or a free-fall drop of 30 cm. To adjust the drop height of the system, the rotors can be activated to generate a desired downward velocity. Finally, to study the integrated dynamic perching mechanism, various characterization tests of the grasper 182 and its components were also performed, with modeling and analysis of the grasping wrench on objects with a circular and rectangular cross sections, and demonstrated a full control pipeline of the aerial robot 100 (from perching, recovering, and landing) in a controlled indoor environment.

From the free-fall drop perching experiments, one can notice that depending on its last position before the rotors are turned off and its landing contact position, the aerial robot 100 does not always land dead center, and could lean slightly to the right or to the left. It is hypothesized that the perching accuracy is related to the minor position errors of the aerial robot 100 during hovering, right before its free-fall drop, as well as minor slippage due to the friction contact and the dynamics of the grasper 182 upon impact with the perch, usually when it experiences a small rebound motion. Future work will look to further understand the grasper 182 through additional characterization of its torsional stability.

With the aerial robot 100, further work can be done to explore its perching capabilities with variable sized and highly textured perchable objects, such as tree branches, and compliant and inclined perches as well. Further work can also look to implement control and perception strategies for autonomous outdoor perching capabilities by visually detecting suitable perches. Future work can also involve in-depth investigations on the energy efficiency and flight aerodynamics of the aerial robot 100 in comparison to conventional multirotor aerial vehicles, during flight.

5. Methods

Figure 25A:
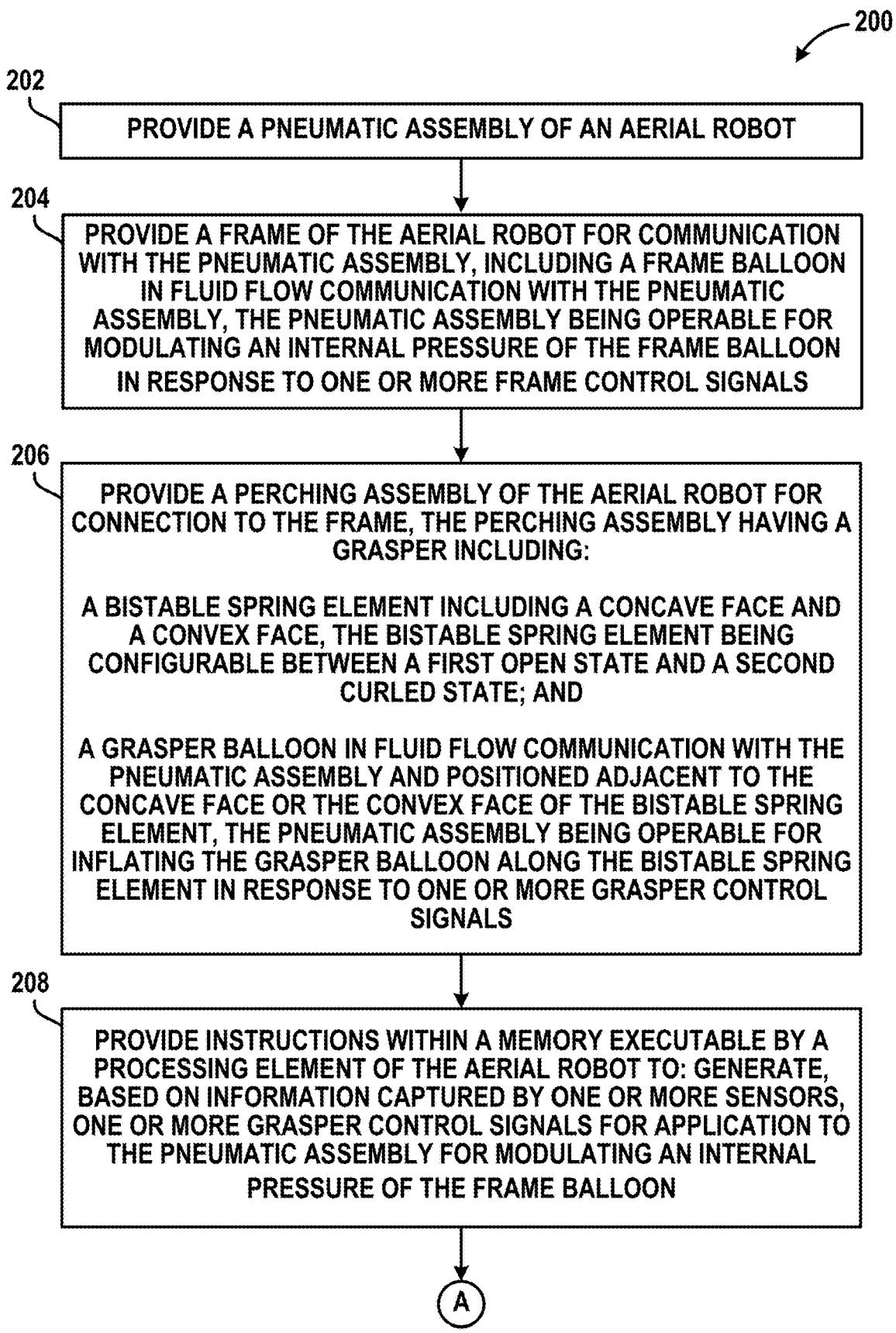
FIGS. 25A and 25B show a method for providing the aerial robot of FIG. 1A according to embodiments outlined herein.
Figure 25B:
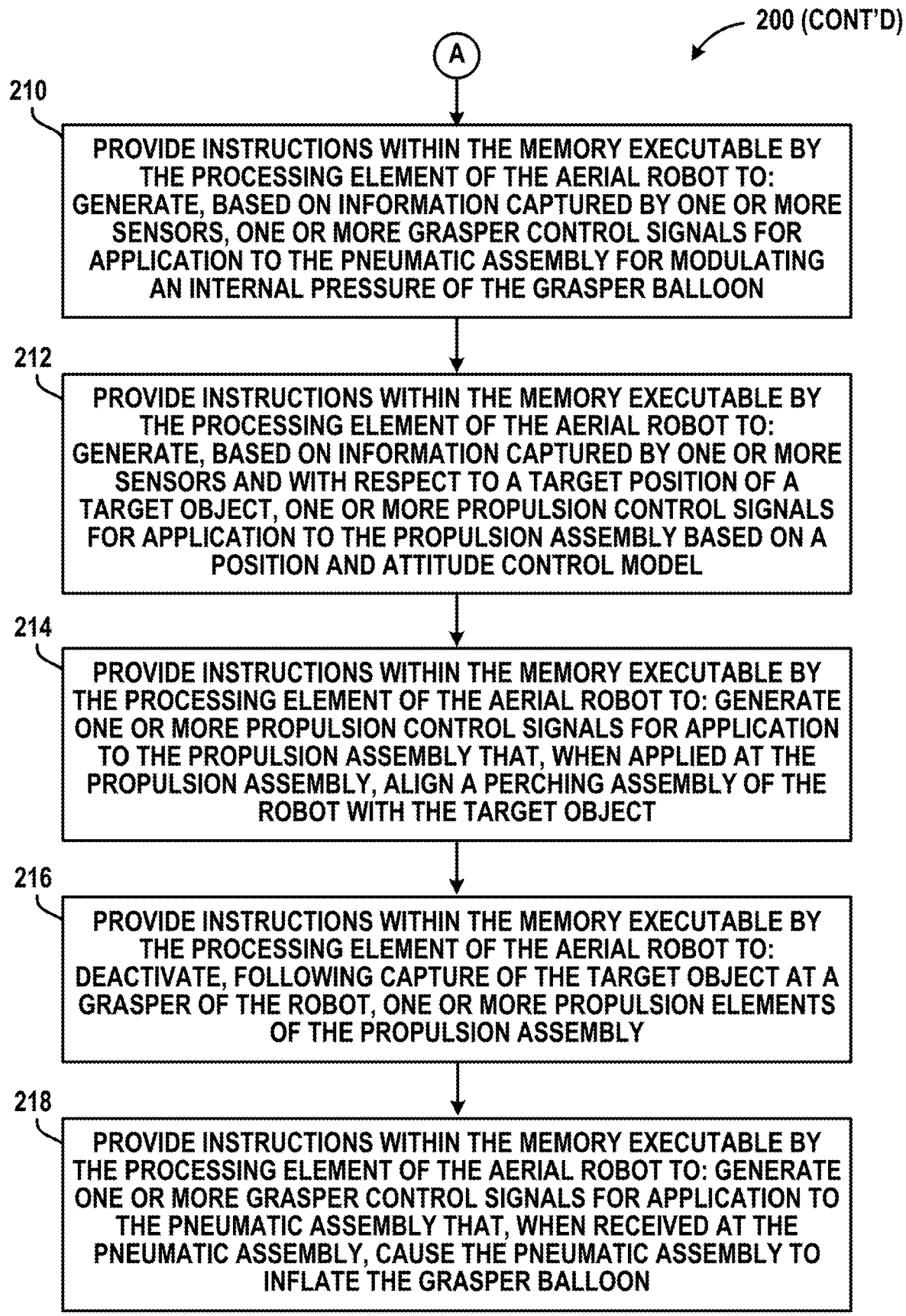

FIGS. 25A and 25B show a method 200 for providing the aerial robot 100 of FIGS. 1A-11E. Note that while the various steps of method 200 are shown in one particular order, it is appreciated that the various steps of method 200 can be applied in any suitable order and may be duplicated or omitted as needed.

Method 200 starts at step 202, which can include providing a pneumatic assembly of an aerial robot.

Step 204 of method 200 can include providing a frame of the aerial robot for communication with the pneumatic assembly, including a frame balloon in fluid flow communication with the pneumatic assembly, the pneumatic assembly being operable for modulating an internal pressure of the frame balloon in response to one or more frame control signals.

Step 206 of method 200 can include providing a perching assembly of the aerial robot for connection to the frame, the perching assembly having a grasper including: a bistable spring element including a concave face and a convex face, the bistable spring element being configurable between a first open state and a second curled state; and a grasper balloon in fluid flow communication with the pneumatic assembly and positioned adjacent to the concave face or the convex face of the bistable spring element, the pneumatic assembly being operable for inflating the grasper balloon along the bistable spring element in response to one or more grasper control signals. Inflating the grasper balloon applies an external force along the bistable spring element when in the second curled state causes the bistable spring element to transition from the second curled state to the first open state.

Step 208 of method 200 can include providing instructions within a memory executable by a processing element of the aerial robot to: generate, based on information captured by one or more sensors, one or more frame control signals for application to the pneumatic assembly for modulating the internal pressure of the frame balloon. FIG. 25A concludes at circle A.

FIG. 25B starts at circle A, and shows additional steps of method 200. Step 210 of method 200 can include providing instructions within the memory executable by the processing element of the aerial robot to: generate, based on information captured by one or more sensors, one or more grasper control signals for application to the pneumatic assembly for modulating an internal pressure of the grasper balloon.

Step 212 of method 200 can include providing instructions within the memory executable by the processing element of the aerial robot to: generate, based on information captured by one or more sensors and with respect to a target position of a target object, one or more propulsion control signals for application to the propulsion assembly based on a position and attitude control model.

Step 214 of method 200 can include providing instructions within the memory executable by the processing element of the aerial robot to: generate one or more propulsion control signals for application to the propulsion assembly that, when applied at the propulsion assembly, align a perching assembly of the robot with the target object.

Step 216 of method 200 can include providing instructions within the memory executable by the processing element of the aerial robot to: deactivate, following capture of the target object at a grasper of the robot, one or more propulsion elements of the propulsion assembly.

Step 218 of method 200 can include providing instructions within the memory executable by the processing element of the aerial robot to: generate one or more grasper control signals for application to the pneumatic assembly that, when received at the pneumatic assembly, cause the pneumatic assembly to inflate the grasper balloon.

The functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

6. Computer-Implemented Device

Figure 26:
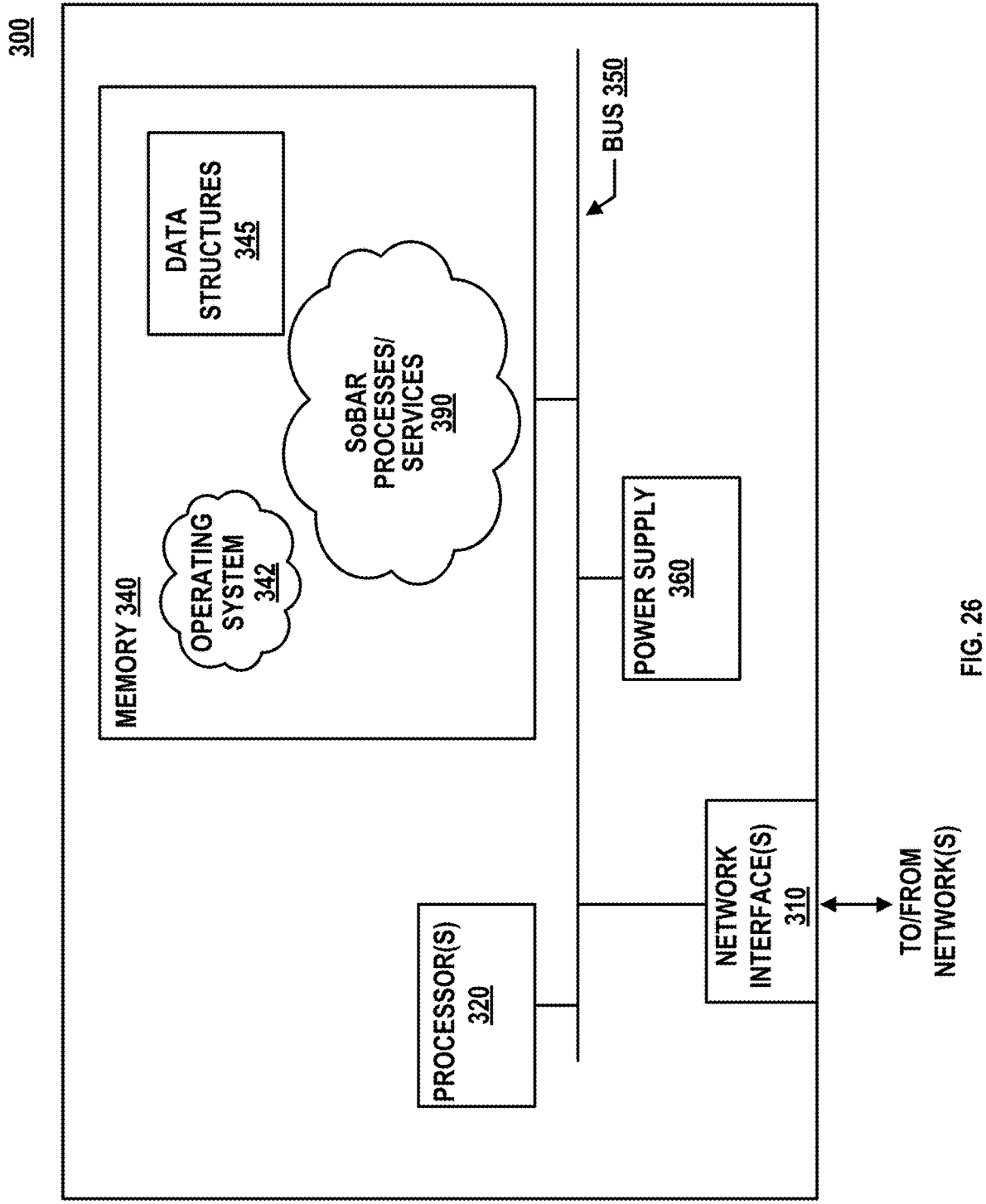
FIG. 26 is a simplified diagram showing an example computing system for implementation of the aerial robot of FIG. 1A.

FIG. 26 is a schematic block diagram of an example device 300 that may be used with one or more embodiments described herein, e.g., as a component of the aerial robot 100, such as flight controller 112 and/or high-level computing device 114 shown in FIGS. 8 and 9.

Device 300 comprises one or more network interfaces 310 (e.g., wired, wireless, PLC, etc.), at least one processor 320, and a memory 340 interconnected by a system bus 350, as well as a power supply 360 (e.g., battery, plug-in, etc.).

Network interface(s) 310 include the mechanical, electrical, and signaling circuitry for communicating data over the communication links coupled to a communication network. Network interfaces 310 are configured to transmit and/or receive data using a variety of different communication protocols. As illustrated, the box representing network interfaces 310 is shown for simplicity, and it is appreciated that such interfaces may represent different types of network connections such as wireless and wired (physical) connections. Network interfaces 310 are shown separately from power supply 360, however it is appreciated that the interfaces that support PLC protocols may communicate through power supply 360 and/or may be an integral component coupled to power supply 360.

Memory 340 includes a plurality of storage locations that are addressable by processor 320 and network interfaces 310 for storing software programs and data structures associated with the embodiments described herein. In some embodiments, device 300 may have limited memory or no memory (e.g., no memory for storage other than for programs/processes operating on the device and associated caches).

Processor 320 comprises hardware elements or logic adapted to execute the software programs (e.g., instructions) and manipulate data structures 345. An operating system 342, portions of which are typically resident in memory 340 and executed by the processor, functionally organizes device 300 by, inter alia, invoking operations in support of software processes and/or services executing on the device. These software processes and/or services may include SoBAR processes/services 390 described herein. Note that while SoBAR processes/services 390 is illustrated in centralized memory 340, alternative embodiments provide for the process to be operated within the network interfaces 310, such as a component of a MAC layer, and/or as part of a distributed computing network environment.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions. Further, while the SoBAR processes/services 390 is shown as a standalone process, those skilled in the art will appreciate that this process may be executed as a routine or module within other processes.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A robot, comprising:
   a pneumatic assembly;
   a frame balloon mounted along a chassis and including a plurality of frame members in fluid flow communication with the pneumatic assembly, the pneumatic assembly being operable for modulating an internal pressure of the plurality of frame members of the frame balloon in response to one or more frame control signals;
   a perching assembly coupled to the chassis, the perching assembly including a grasper including a bistable spring element including a concave face and a convex face, the bistable spring element being configurable between a first open state and a second curled state; and
   a processing element in communication with the pneumatic assembly and a memory, the memory including instructions executable by the processing element to:
   generate, based on information captured by one or more sensors, one or more frame control signals for application to the pneumatic assembly for modulating an internal pressure to decrease a stiffness of the plurality of frame members such that the plurality of frame members deflect upon contact between the grasper and a perching structure during a perching sequence to compensate for an external wrench force generated upon impact between the grasper and the perching structure during transitioning of the bistable spring element from the first open state to the second curled state.

2. The robot of claim 1, the memory further including instructions executable by the processing element to:
   generate, based on information captured by the one or more sensors, one or more frame control signals for application to the pneumatic assembly based on collision detection information obtained using a position and attitude control model, wherein during flight the pneumatic assembly modulates an internal pressure to increase a stiffness of the frame balloon for collision resilience.

3. The robot of claim 1, further comprising:
   a propulsion assembly coupled to the frame balloon and operable for actuating one or more propulsion elements positioned along respective frame members of the plurality of frame members in response to one or more propulsion control signals.

4. The robot of claim 3, the memory further including instructions executable by the processing element to:
   generate, based on information captured by the one or more sensors, one or more propulsion control signals for application to the propulsion assembly based on a position and attitude control model.

5. The robot of claim 1,
   wherein application of an external collision force along the concave face of the bistable spring element when in the first open state causes the bistable spring element to transition to the second curled state.

6. The robot of claim 5, the grasper being in communication with the pneumatic assembly and the processing element, the grasper including:
   a grasper balloon in fluid flow communication with the pneumatic assembly and positioned adjacent to the concave face or the convex face of the bistable spring element, the pneumatic assembly being operable for inflating the grasper balloon along the bistable spring element in response to one or more grasper control signals;
   wherein inflating the grasper balloon applies an external force along the bistable spring element when in the second curled state causes the bistable spring element to transition from the second curled state to the first open state.

7. The robot of claim 6, the memory further including instructions executable by the processing element to:
   generate one or more grasper control signals for application to the pneumatic assembly that, when received at the pneumatic assembly, cause the pneumatic assembly to inflate the grasper balloon.

8. A robot, comprising:
   a pneumatic assembly;
   a frame balloon mounted along a chassis and including a plurality of frame members in communication with the pneumatic assembly; and
   a perching assembly coupled to the chassis, the perching assembly including a grasper including a bistable spring element including a concave face and a convex face, the bistable spring element being configurable between a first open state and a second curled state;
   wherein the pneumatic assembly is configured to modulate an internal pressure to decrease a stiffness of the plurality of frame members such that the plurality of frame members deflect upon contact between the grasper and a perching structure during a perching sequence to compensate for an external wrench force generated upon impact between the grasper and the perching structure during transitioning of the bistable spring element from the first open state to the second curled state.

9. The robot of claim 8, wherein application of an external collision force along the concave face of the bistable spring element when in the first open state causes the bistable spring element to transition to the second curled state.

10. The robot of claim 8, the grasper being in communication with the pneumatic assembly, the grasper including:
a grasper balloon in fluid flow communication with the pneumatic assembly and positioned adjacent to the concave face or the convex face of the bistable spring element, the pneumatic assembly being operable for inflating the grasper balloon along the bistable spring element in response to one or more grasper control signals;
wherein inflating the grasper balloon applies an external force along the bistable spring element when in the second curled state causes the bistable spring element to transition from the second curled state to the first open state.

11. The robot of claim 10, further comprising:
a processing element in communication with the pneumatic assembly and a memory, the memory including instructions executable by the processing element to:
generate one or more grasper control signals for application to the pneumatic assembly that, when received at the pneumatic assembly, cause the pneumatic assembly to inflate the grasper balloon.

12. The robot of claim 8,
the pneumatic assembly being operable for modulating an internal pressure of the frame balloon in response to one or more frame control signals.

13. The robot of claim 8, further comprising:
a propulsion assembly coupled to the frame balloon and operable for actuating one or more propulsion elements positioned along respective frame members of the plurality of frame members in response to one or more propulsion control signals.

14. The robot of claim 13, further comprising:
a processing element in communication with the pneumatic assembly and a memory, the memory including instructions executable by the processing element to:
generate, based on information captured by one or more sensors and with respect to a target position of a target object, one or more propulsion control signals for application to the propulsion assembly based on a position and attitude control model;
generate one or more propulsion control signals for application to the propulsion assembly that, when applied at the propulsion assembly, align the perching assembly of the robot with the target object; and
deactivate, following capture of the target object at the grasper of the robot, one or more propulsion elements of the propulsion assembly.

15. The robot of claim 6, wherein during the perching sequence the pneumatic assembly is configured to modulate an internal pressure to decrease a stiffness of the frame balloon and the grasper balloon for controlling a deflection angle of the plurality of frame members upon contact between the grasper and the perching structure and enabling transitioning of the bis table spring element from the first open state to the second curled state.

16. The robot of claim 6, wherein during flight the pneumatic assembly is configured to modulate an internal pressure to increase a stiffness of the frame balloon and the grasper balloon for collision resilience and to prevent transitioning of the bistable spring element from the first open state to the second curled state.

17. The robot of claim 3, further comprising:
a processing element in communication with the propulsion assembly and a memory, the memory including instructions executable by the processing element to:
estimate, based on information captured by one or more sensors including an internal pressure of the frame balloon, a thrust loss coefficient associated with deflection of a frame member of the plurality of frame members; and
generate one or more propulsion control signals for application to the propulsion assembly based on a position and attitude control model, the position and attitude control model incorporating the thrust loss coefficient.

18. The robot of claim 10, wherein during the perching sequence the pneumatic assembly is configured to modulate an internal pressure to decrease a stiffness of the frame balloon and the grasper balloon for controlling a deflection angle of the plurality of frame members upon contact between the grasper and the perching structure and enabling transitioning of the bis table spring element from the first open state to the second curled state.

19. The robot of claim 10, wherein during flight the pneumatic assembly is configured to modulate an internal pressure to increase a stiffness of the frame balloon and the grasper balloon for collision resilience and to prevent transitioning of the bistable spring element from the first open state to the second curled state.

20. The robot of claim 13, further comprising:
a processing element in communication with the propulsion assembly and a memory, the memory including instructions executable by the processing element to:
estimate, based on information captured by one or more sensors including an internal pressure of the frame balloon, a thrust loss coefficient associated with deflection of a frame member of the plurality of frame members; and
generate one or more propulsion control signals for application to the propulsion assembly based on a position and attitude control model, the position and attitude control model incorporating the thrust loss coefficient.

* * * * *